United States Patent [19]
Rangan et al.

[11] Patent Number: 6,006,265
[45] Date of Patent: Dec. 21, 1999

[54] HYPERLINKS RESOLUTION AT AND BY A SPECIAL NETWORK SERVER IN ORDER TO ENABLE DIVERSE SOPHISTICATED HYPERLINKING UPON A DIGITAL NETWORK

[75] Inventors: P. Venkat Rangan; Vijnan Shastri; P. Srihari Sampath-Kumar; Arya Ashwani, all of San Diego, Calif.

[73] Assignee: HOTV, Inc., San Diego, Calif.

[21] Appl. No.: 09/054,362

[22] Filed: Apr. 2, 1998

[51] Int. Cl.$^6$ .................................................... G06T 1/00
[52] U.S. Cl. ............................................ 709/226; 709/229
[58] Field of Search .................................... 707/502, 501; 345/302, 2, 10, 104; 709/226, 229, 218, 249, 200, 227

[56] References Cited

U.S. PATENT DOCUMENTS

| | | | |
|---|---|---|---|
| 5,583,997 | 12/1996 | Hart | 709/218 |
| 5,586,259 | 12/1996 | Kabe | 709/249 |
| 5,659,685 | 8/1997 | Williams | 709/220 |
| 5,675,507 | 10/1997 | Bobo, II | 709/206 |
| 5,740,231 | 4/1998 | Cohn | 379/88.22 |
| 5,761,415 | 6/1998 | Joseph et al. | 709/200 |
| 5,802,316 | 9/1998 | Ito | 709/249 |
| 5,809,512 | 9/1998 | Kato | 707/502 |
| 5,815,664 | 9/1998 | Asano | 709/227 |

*Primary Examiner*—Zarni Maung
*Assistant Examiner*—Khanh Quang Dinh
*Attorney, Agent, or Firm*—Fuess & Davidenas

[57] ABSTRACT

Streaming digital hypervideo including copious embedded hyperlinks is distributed upon a digital communications network from a hypervideo server, normally an Internet Service Provider, to multitudinous client subscribers/users/viewers (client SUVs). Some or all of the client SUVs receive the same hyperlinks at the same place in the streaming hypervideo. Some small fraction of the client SUVs selectively volitionally exercise a fraction of the total hyperlinks, causing an access in the background of the unfolding hypervideo across the digital communications network to yet another server commonly called a "Video On Web server", or "VOW server". The VOW sever interprets each hyperlink request in consideration of (i) the identity of the exercising client SUV and, most commonly, (ii) additional data of a demographic, socioeconomic, credit, viewing preference, security and/or past hyperlinking history nature. The VOW Server supplies each hyperlink-exercising client SUV with a potentially custom hyperlink —normally in the form of a network universal resource locator (URL) or an index to a file of URLs—while keeping track of commercially useful data regarding the client SUV response(s). Each client SUV uses its own associated received URL to retrieve a potentially unique resource. The resource can be internal, such as an executable software program, but is normally located somewhere on the network and is typically in the nature of tailored and/or targeted advertisements, messages of personal or local or temporal pertinence and/or urgency, and/or the results of contests or lotteries. Hypervideo hyperlinks are thus dynamically resolved during streaming network communications to support full custom hyperlinking by each of multitudinous networked client SUVs.

31 Claims, 11 Drawing Sheets

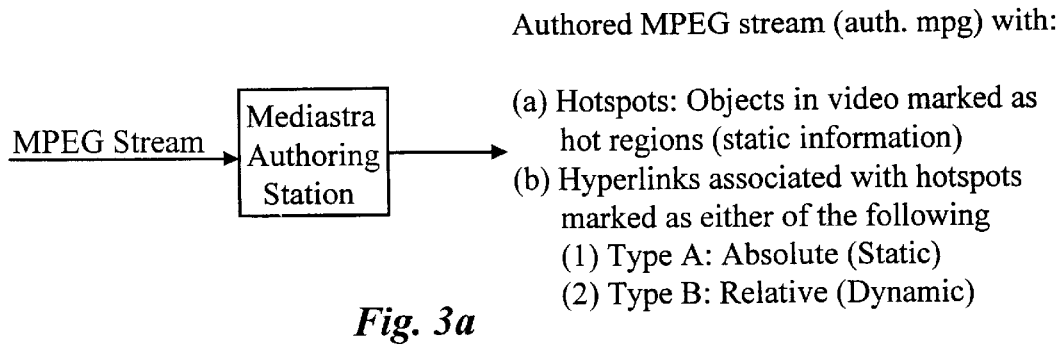

Authored MPEG stream (auth. mpg) with:

(a) Hotspots: Objects in video marked as hot regions (static information)
(b) Hyperlinks associated with hotspots marked as either of the following
   (1) Type A: Absolute (Static)
   (2) Type B: Relative (Dynamic)

*Fig. 3a*

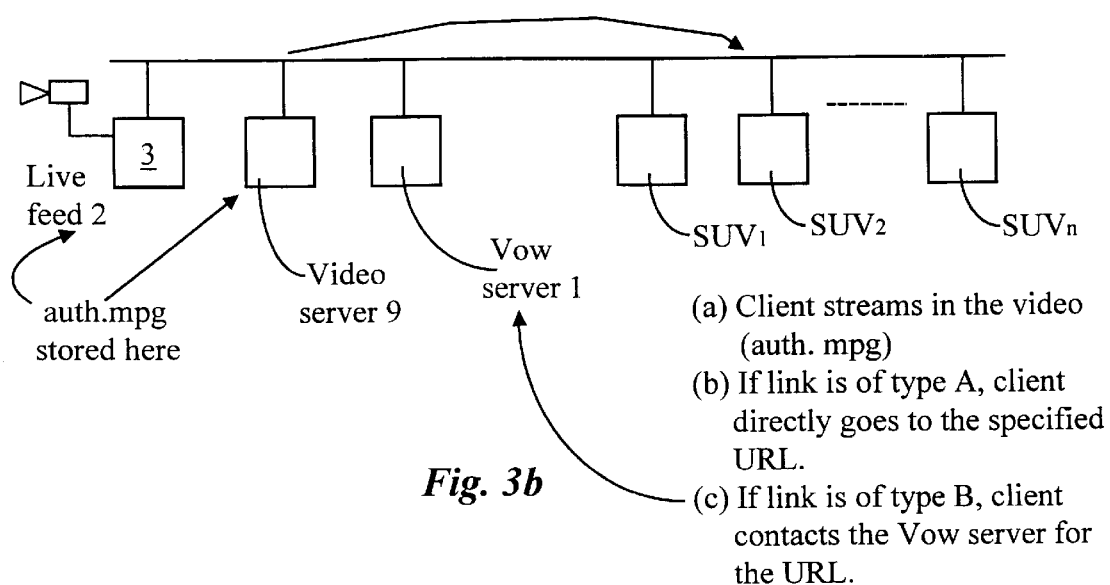

(a) Client streams in the video (auth. mpg)
(b) If link is of type A, client directly goes to the specified URL.
(c) If link is of type B, client contacts the Vow server for the URL.

*Fig. 3b*

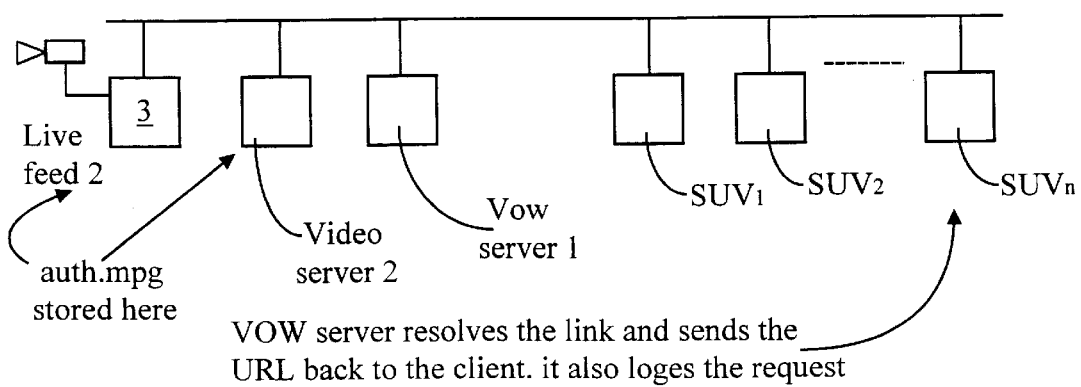

VOW server resolves the link and sends the URL back to the client. it also loges the request

*Fig. 3c*

User's web page playing hypervideo in VOW!VCR

Click on hotspot invokes a web page

User's web page playing hypervideo in VOW!VCR

Click on hotspot takes user to another video

User's web page playing hypervideo in VOW!VCR

Click on hotspot takes user to a slide show

HYPERLINKS RESOLUTION AT AND BY A SPECIAL NETWORK SERVER IN ORDER TO ENABLE DIVERSE SOPHISTICATED HYPERLINKING UPON A DIGITAL NETWORK

RELATION TO RELATED PATENT APPLICATIONS

The present patent application is related to the following U.S. patent application: Ser. No. 09/088,513 for the REAL-TIME RECEIPT, DECOMPRESSION AND PLAY OF COMPRESSED STREAMING VIDEO/HYPERVIDEO, WITH (1) DISPLAY OF PAST SCENES, (2) RETROSPECTIVE HYPERLINKING AND/OR RETROSPECTIVE RECORDING AS ARE BOTH KEYED TO DISPLAYED PAST SCENES, AND, WITH SPECIAL SERVER SUPPORT, (3) DIVERSE VERSATILE RESPONSES TO HYPERLINKS, filed on Jun. 1, 1998, which application concerns a client subscriber/user/viewer upon the same digital communications network as is the special server of this application, and the of the related applications is to inventors including certain inventors of the present application.

All applications are assigned to common assignee Tata America International Corporation. The contents of the related patent applications are incorporated herein by reference.

BACKGROUND OF THE INVENTION

1. Field of the Invention

The present and related inventions generally concern (i) the machine-automated distribution, processing and network communication of streaming digital video/hypervideo, particularly upon digital networks having network content providers (nominally an "Internet Content Provider", or "ICP"), network service providers (nominally an "Internet Service Provider", or "ISP"), and network client subscribers/users/viewers ("client SUVs"). The present and related inventions also generally concern the provision of diverse sophisticated responses—including branching, storage, playback/replay, subscriber/user-specific responses, and contests—to SUV "click-throughs" on hyperlinks embedded within streaming digital hypervideo.

The present invention in particular concerns software processes operating at a special digital communications network server called a "Video On Web Server", or "VOW Server". This VOW Server does not normally serve streaming digital video, nor hypervideo (which instead comes from video servers that may be associated with any of content providers, network service providers, and/or third-party network sites such as advertisers) upon the network, but rather interprets hyperlinks present in streaming digital hypervideo when these hyperlinks are selectively exercised by individual client subscribers/users/viewers (SUVs) of the hypervideo. The hyperlink interpretation that is the field of the present invention is in particular directed to customizing the hyperlinked response(s) accorded each and every client SUV. As well as being customized to the individual client SUV, the responses are very diverse in nature, potentially invoking many different network resources at many different network locations.

2. Description of the Prior Art
2.1. Introduction to the Theory of Hypervideo There is no requirement to read the present section 2.1—which section is based on the early investigations and research into hypervideo of Sawhney, et al., as transpired at MIT (reference cited below)—in order to understand the function, and, at a crude level, the purpose(s) of the present invention. However, hypervideo is, as of the present time (1998) very new, and few people have experienced it. The present section may accordingly beneficially be read in order to gain a "feel" for hypervideo.

More fundamentally, the present section discusses the considerable power of hypervideo, and ends with a discussion of the empowerment that hypervideo provides to a user-viewer. The present and related inventions, although they can be narrowly thought of as mere systems and methods for delivering lowly commercials in the hypervideo environment, are really totally consistent with the more profound, and the more ennobling, purposes of hypervideo. Therefore the present section may also beneficially be read to understand to what purposes—both good and ill—hypervideo may be put, and as background to how the present and related inventions serve these purposes.

In recent years Sawhney, et al., at MIT (reference cited below) have developed an experimental hypermedia prototype called "HyperCafe" as an illustration of a general hypervideo system. This program places the user in a virtual cafe, composed primarily of digital video clips of actors involved in fictional conversations in the cafe; HyperCafe allows the user to follow different conversations, and offers dynamic opportunities of interaction via temporal, spatio-temporal and textual links to present alternative narratives. Textual elements are also present in the form of explanatory text, contradictory subtitles, and intruding narratives. Based on their work with HyperCafe, Sawhney, et al. have been leaders in discussing the necessary components and a framework for hypervideo structures, along with the underlying aesthetic considerations. The following discussion is drawn entirely from their work.

"Hypervideo" can be defined as "digital video and hypertext, offering to its user and author the richness of multiple narratives, even multiple means of structuring narrative (or non-narrative), combining digital video with a polyvocal, linked text." Hypervideo brings the hypertext link to digital video. See Sawhney, Nitin, David Balcom, Ian Smith "HyperCafe: Narrative and Aesthetic Properties of Hypervideo." Proceedings of the Seventh ACM Conference on Hypertext. New York: Association of Computing Machinery, 1996.

An even earlier approach to hypermedia was proposed by George Landow, in which he offered rules for hypermedia authors, rules that took into account hypermedia's derivation from print media and technologies of writing. Landow proposed that hypermedia "authors" learn which aspects of writing applied to the emerging hypermedium, and which traits or characteristics needed redefinition and rethinking. He noted: "To communicate effectively, hypermedia authors must make use of a range of techniques, suited to their medium, that will enable the reader to process the information presented by this new technology." See Landow, George P. "The Rhetoric of Hypermedia: Some Rules for Authors." Journal of Computing in Higher Education, 1 (1989), pp. 39–64; reprinted in Hypermedia and Literary Studies, ed. by Paul Delany and George P. Landow, Cambridge, Massachusetts: MIT Press, 1991.

Hypervideo has its roots in both hypertext and film. As a result, hypervideo embodies properties of each field, but wholly can be placed in neither, for hypervideo is not strictly linear motion picture, nor is it strictly hypertext. This convergence known as hypervideo comments on each discipline, on their similarities, and on their differences. Hypervideo is potentially nonlinear, like hypertext, but displays moving images, like film. Hypervideo can signify through montage, like film, and can generate multiple dictions, like hypertext. Properties of each medium are present in hypervideo. These properties take on new forms and practices in hypervideo.

Hypervideo relocates narrative film and video from a linear, fixed environment to one of multivocality; narrative sequences (video clips followed by other video clips) need not subscribe to linearity. Instead of creating a passive viewing subject, hypervideo asks its user to be an agent actively involved in creation of text through choice and interaction. Hypervideo can potentially change viewing subject from a passive consumer of the text to an active agent who participates in the text, and indeed, is engaged in constructing the text.

Just as hypertext necessitated a re-reading of the act of reading and writing, hypervideo asks for a re-viewing of narrative film and film making and practices of viewing a film. Hypervideo redefines the viewing subject by breaking the frame of the passive screen. Hypervideo users are participants in the creation of text, as hypertext readers are.

Research is presently (circa 1997) projected to determine just how users of hypervideo systems navigate, interact with, and experience hypervideo-texts. Just as J. Yellowlees Douglas has exhaustively researched hypertext readers and the act of hypertext reading, similar projects are expected to be undertaken by hypervideo researchers. See Douglas, J. Yellowlees. "Understanding the Act of Reading: the WOE Beginner's Guide to Dissection." Writing on the Edge, 2.2. University of California at Davis, Spring 1991, pp. 112–125. See also Douglas, J. Yellowlees. "'How Do I Stop This Thing?': Closure and Indeterminacy in Interactive Narratives." Hyper/Text/Theory, ed. by George P. Landow. Baltimore: The Johns Hopkins University Press, 1994.

Hypervideo is related to film. Hypervideo has the potential to reveal important associations present in a film, and the constructedness of linear filmic narratives, and to this end, would be a beneficial tool for use with film studies education and research. Hypervideo can make available, by way of link opportunities, the different associations and allusions present in a filmic work. These associations are made manifest with hypervideo, made available for the student (or teacher) to see and explore. Relationships between different films can then be tracked, linked, commented on, revealed.

Hypervideo engages the same idea of "processing" that hypertext writing does: in writing hypertext, one makes available the process of writing, representing it visually (in the form of the web the writer builds), rhetorically (in the linking structure of the work, the points of arrival and departure present in the text)-and so one makes apparent the tensions and lines of force present in the act of writing, and the creation or reification of narrative. "Writing" hypervideo does the same for image-making-that is, makes clear the notion of constructing images and narrative. In the case of hypervideo, "narrative" refers to narrative film making. Just as hypertext has within it the potential to reveal the constructedness of linear writing, and to challenge that structure, hypervideo does the same for narrative film making-while also offering the possibilities for creating rich hypervideo texts, or videotexts.

How does narrative film function in hypervideo? Narrative film is necessarily re-contextualized as part of a network of visual elements, rather than a stand-alone filmic device. Because narrative segments can be encountered out of sequence and (original) context, even strictly linear video clips are given nonlinear properties.

Sergei Eisenstein pioneered the concept and use of montage in film. Hypervideo reveals and foregrounds this use. Eisenstein proposed that a juxtaposition of disparate images through editing formed an idea in the viewer's head. It was Eisenstein's belief that an idea-image, or thesis, when juxtaposed through editing, with another, disparate image, or antithesis, produced a synthesis in the viewing subject's mind. In other words, synthesis existed not on film as idea-image, but was a literal product of images to form a separate image-idea that existing solely for the viewer.

Eisenstein deliberately opposed himself to continuity editing, seeking out and exploiting what Hollywood could call "discontinuities." He staged, shot, and cut his films for the maximum collision from shot to shot, sequence to sequence, since he believed that only through being force to synthesize such conflicts does the viewer participate in a dialectical process. Eisenstein sought to make the collisions and conflicts not only perceptual but also emotional and intellectual." See Bordwell, David and Kristin Thompson. Film Art: An Introduction. Fourth Edition. New York: McGraw-Hill, Inc., 1993.

Hypervideo potentially reveals this thesis/antithesis dialectic, by allowing the user to choose an image-idea (in this case, a video clip), and juxtaposing it with another image-idea (another video clip). Hypervideo allows the user to act on discontinuities and collisions, to engage with colliding subtexts and threads.

The user selects a video clip from a black canvas of three or four clips. Each clip lies motionless on the canvas. The user drags a clip onto another one, and they both start to play. Voices emerge and collide, and once-separate image-ideas now play concurrently, with one image extending the frame of the other. The user is left to determine the relationship between the two (or three or four) video clips.

Such video intersections recall Jim Rosenberg's notion of simultaneities, or the "literal layering on top of one another of language elements." See Rosenberg, Jim. "Navigating Nowhere/Hypertex Infrawhere." ECHT 94, ACM SIGLINK Newsletter. December 1994, pp. 6–19. Instead of language elements, video intersections represent the layering of visual elements, or more specifically, visual elements in motion. This is not to say that words, in the case of Rosenberg's Intergrams, are not visual elements; on the contrary, they are. In fact, their image-ness is conveyed with much more clarity (and even urgency) than are non-simultaneous words, or words without an apparent visual significance (save the "transparent" practice of seeing "through" letter-images into words into sentences into concepts). Once the word-images have to contend with their neighbor-layers for foreground screen space, their role in both the practice of signification (where meaning is contingent on what neighborly 0's and 1's are NOT), and as elements of a user interface (words that yield to the touch or click or wave of the mouse) become immediate and obvious. Nor is this to say that video clips aren't "language elements"; on the contrary, they are. The hypervideo clip is caught, as are words and letters, in the act of signification and relational meaning-making (. . . what neighborly 0's and 1's are not . . . ), mutable to the very touch of user, to the layers above and below.

The hypervideo author can structure these video intersections in such a way that only X and Y clips can be seen together, or X and Z if Y has already been seen (like Storyspace's guard fields), and so on, and the author can decide if a third video should appear upon the juxtaposition of X and Y. For example, Video X is dragged onto Video Y and they both start to play. The author can make a choice to then show video Z as a product, or synthesis, of the juxtaposition of Videos X and Y, that reflects or reveals the relationship between Videos X and Y. This literal revealing of Eisenstein's synthesis is made possible with hypervideo. Of course, no synthesis need be literally revealed; that can be left up to the viewer. While the interactions are structured by the hypervideo author or authors (as Eisenstein structured the placement and editing of thesis and antithesis idea-images), the meaning-making is left up to the hypervideo user. His or her choice reveals meaning to him with each video intersection; meaning in the system is neither fixed nor pre-determined. This empowering principle of hypertext is also a property of hypervideo.

2.2. Recent Practical Developments in Hypervideo

The V-Active HyperVideo Authoring Environment of Ephyx Technologies, Ltd. is a hypervideo authoring tool reportedly designed to develop interactivity in full-motion digital video applications. The V-Active product is based on a proprietary hypervideo technology that enables (i) automatic definition of objects, or hotspots, within an application's video stream and (ii) linking of those objects to video, sound, and text files, plus Web URLs.

Using an image processing algorithm, the V-Active' product is reported to define a video hotspot once and to then automatically maintain this hotspot across the video sequence. The software is reportedly capable of maintaining the hotspots even through fast action and low-light video sequences. Developers can choose among a dozen hotspot attributes, including author-defined shapes, overlay colors, and cursor-overrun reactions.

Ephyx calls this authoring strategy hypervideo—full-motion digital video with embedded hyperlinks to related content through automated means of creating video "hotspots." In accordance with the general concept of hypervideo, these hotspots link moving objects within a video sequence to a variety of media, including static pictures, text, sounds, URLs, other video sequences, or executable software applications. Hotspots are evident to the user either by changes in the cursor shape or on-screen object-specific highlighting. Other features of the V-Active product include automated motion tracking, synchronized playback of multiple media elements streaming simultaneously, and platform independence and support for numerous digital video formats.

The Ephyx software reportedly also enables developers to create applications in which end-users simply click on highlighted objects within a video to link instantly to related content via various connections, including selected URLs. The V-Active product further reportedly permits that hyperlinked videos created with V-Active may be integrated into a variety of environments; a V-Active Director Xtra integrates V-Active interactive video elements into Director applications, while the V-Active ActiveX Control and V-Active Netscape Plug-In embed hyperlinked video into Web pages.

With V-Active, authors can enable pointing and clicking between digital video hotspots, and they can also define any moving objects as gateways to other video sequences or to activating other applications. Interactive video clips produced with V-Active can be integrated into existing environments using a Macromedia Director 5 Xtra and Microsoft Active X control. Refer to the web page and product literature of Ephyx Technologies, P.O. Box 12503, 9 Maskit Street, Herzliya 46733, Israel (http://www.ephyx.com as of 1998).

SUMMARY OF THE INVENTION

The present and related inventions contemplate high-performance hypervideo. In general, the inventions contemplate (i) machine (computer) processes for efficiently making effective—meaning powerful and useful—hypervideo, and (ii) machine (computer) processes for providing versatile, unique and highly useful responses to the hypervideo so made.

The hypervideo (i) so made, and (ii) so used, goes way beyond mere digital television with embedded hyperlinks communicated upon a digital network—interesting, useful and, in parts, novel as even this concept may be. Instead, the present and related inventions contemplate full custom hypervideo: each and every one of hundreds and of thousands of subscriber/user/viewers upon a digital communications network is, by and large, (a) receiving copious digital hypervideo hyperlinks, with (b) any and all actions ("click-throughs") on any hyperlinks being resolved in respect of (i) when it happens, (ii) from which client SUV it happens, and (iii) even in respect of what is happening at other client SUVs.

Although, to some, it may initially appear impossible that, circa 1998, tailored customization and versatility of any great magnitude in the delivery of digital information so extensive as is hypervideo could be realized in and by existing computers communicating across existing broadband digital networks, the present and related inventions are quite feasible. Basically, in accordance with the present and related inventions, hypervideo management (for benefit of client SUVs, individually; as is the subject of the present invention) is partially divorced from hypervideo generation and delivery (as are the subjects of two related patent applications) is yet still further partially divorced from hypervideo use (in client SUVs; as is the subject of yet another related patent application). Thus the several demanding functions for a complete hypervideo system are distributed upon the digital communications network. By this partitioning of the various functions within a digital network hypervideo system, the computer software processes of the present and related inventions—already implemented and presently running on (i) modern digital network servers communicating streaming digital hypervideo across cable networks to (ii) cable modems present in Pentium®-class personal computers of client SUVs—permit unprecedented flexibility. (Pentium® is a registered trademark of Intel, Inc.)

Basically every single one of thousands of client SUVs served by a single (typically neighborhood) network service provider (ISP), typically by coaxial cable, is able to select for viewing—whenever, in whatsoever sequence and at whatsoever pace, interruption(s) and branching as are then desired—several scores of different choices of video each of which is normally held available over a span of some days, and then replaced. In return for permitting thousands of client SUVs each to "do their own" thing in (hyper)video viewing, the ISP definitively knows what particular (hyper) video each (and every) individual client SUV is receiving. Furthermore, importantly, and in accordance with the present invention, a special network server (which may be located at the ISP, or as another server on the network) comes to know which responses (if any) each (and every) client SUV ever makes to hyperlinks.

Using the power of this knowledge, certain network resources provided/linked to the individual client SUVs—notably commercials—are "targeted" on the particular client SUV. Thus the "price" to the client SUV for high performance, flexibility and personal control in his/her (hyper)video viewing is that information is surrendered about his/her individual habits and preferences—which situation is, of course, nonexistent for television broadcast either on the airwaves or upon digital communications networks.

1. Context of the Present Invention Within Related Inventions, and Within a Complete System for Enabling Hypervideo on Digital Communications Networks A first and a second related invention to the present invention respectively concern (i) making and (ii) distributing hypervideo. Hypervideo is (i) made from (a) video and (b) hyperlinks by software-based editing processes. Such a hypervideo editor is taught in the related patent application for HYPERVIDEO AUTHORING AND EDITING BY DRAGGING AND DROPPING DIVERSE HYPERLINKS INTO AUTOMATICALLY-DETECTED SCENE HOTSPOTS, WITH SCENES' DURATIONS BEING FURTHER AUTOMATICALLY DETECTED.

Perhaps more interestingly, these processes may be automated or semi-automated, so as to efficiently seamlessly insert hyperlinks into video, including in real time while the video remains compressed. Hypervideo may thus be both (i) made and (ii) distributed in real time, for example in the form of a hyperlink-annotated live video newscast. The insertion of video and hypervideo clips and hyperlinks in streaming digital video/hypervideo is taught within the related patent application for REAL-TIME TARGETED INSERTION OF VIDEO CLIPS, HYPERVIDEO CLIPS AND/OR HYPERLINKS IN COMPRESSED STREAMING VIDEO, INCLUDING DYNAMICALLY AT MULTIPLE POINTS BETWEEN CONTENT PROVIDERS AND SUBSCRIBERS IN DIGITAL NETWORKS.

The inserted hyperlinks will ultimately, and indirectly in accordance with the present invention, serve to access still further, other, digital (hyper)video clips, particularly commercials. This hyperlink insertion is normally done at any of a network content provider, or Internet Content Provider (an "ICP"), an Internet Service Provider (an "ISP"), and/or a Local Network Affiliate (a "LNA"). The video with inserted hyperlinks, ergo hypervideo, is variously received (by means ranging from a transported disk to network communication) at a network video server, and is ultimately served on demand to each client subscriber/user/viewer ("SUV") upon a digital communications network by this video server.

A next, third, related invention concerns the receipt of the streaming digital hypervideo upon the network, and the display at each of potentially thousands of client subscribers/users/viewers (client SUVs) of the received hypervideo and its embedded "hotspots" (which are visual manifestations of hyperlinks). Selective volitional exercise of any inserted hyperlink(s)—the existence of which hyperlink(s) is (are) made visually manifest to the SUV as hotspots on the video imagery—by the client SUV is typically by action of the SUV to "point and click" with a computer mouse, a so-called "click through".

A click-through on an embedded hyperlink by the client SUV sets in motion the present invention, which is a software-based process present upon a special network server. (This special server may, however, have other roles such as being a, or the, network/Internet content provider (ICP), video server, or network service provider/internet service provider (ISP).)

The present invention is particularly directed to the custom management of streaming digital video/hypervideo for each single one of potentially thousands and tens of thousands of subscribers/users/viewers (SUVs) upon a digital network communicating, inter alia, hypervideo. Each and every client SUV may receive any of (i) video/hypervideo content, (ii) hyperlinks, (iii) services, such as record/storage and playback/replay, (iv) controlled access to information (such as is commonly used to restrict viewing by children), and/or (v) contest results, in accordance with his, her or their unique (network) identity.

In functioning to manage and to condition plural streams of digital hypervideo responsively to, at least partially, the unique dictates (choices) and/or the unique identity of an individual SUV, a computer program of the present invention operating at the special server (which server may, however, also be an ICP, an ISP or a LNA) cooperatively interacts with a compatible computer program operating in the network-connected computer of the SWV.

The special server is called a "Video On Web Server", or "VOW Server". (It is also, alternatively, called a "HOTV™ Server", where HOTV™ is a trademark of Tata America International Corporation, assignee of the present invention; although this term will not be used within this specification.) At first presentation, the names "Video On Web Server", or "VOW Server" may be slightly confusing: this server does not particularly, primarily, or uniquely serve (hyper)video on the digital network, or web, it enables hypervideo on the digital network, or web, in a manner to be explained. To say again, the VOW Server is not normally a server of streaming digital video, or hypervideo, which normally comes from video servers that may be associated with any of content providers, network service providers, and/or third-party network sites such as advertisers. The VOW Server is given its expansive name because, however, it will soon be seen to enable the distribution and the progression, and the custom distribution and progression, of (hyper)video to, and at, all the network client SUVs.

The computer program resident at the client SUV, and complimentary to the "VOW Server", is called a "Video On Web Video Cassette Recorder", or "Video on Web VCR", or just simply "VOW VCR". (Similarly to the "HOTV™ Server", this client program is also called a "HOTV™ Client" where HOTVM is a trademark of Tata America International Corporation, assignee of the present invention; although this term will not be used within this specification.) This VOW VCR of the SUV is described in the companion patent disclosure for REAL-TIME RECEIPT, DECOMPRESSION AND PLAY OF COMPRESSED STREAMING VIDEO/HYPERVIDEO, WITH (1) DISPLAY OF PAST SCENES, (2) RETROSPECTIVE HYPERLINKING AND/OR RETROSPECTIVE RECORDING AS ARE BOTH KEYED TO DISPLAYED PAST SCENES, AND, WITH SPECIAL SERVER SUPPORT, (3) DIVERSE VERSATILE RESPONSES TO HYPERLINKS. The "SPECIAL SERVER" referred to in the title of this related application is the subject of the present application. Note that the "special server" supports "diverse versatile responses to hyperlinks".

In simplistic terms, the related inventions may be considered to concern (i) how to make fully group or community-customized and time-customized hypervideo, normally at an ICP/ISP/LNA, and (ii) how each SUV, or client, may sense and may exercise hyperlinks within streaming digital hypervideo, while the present invention concerns (ii) how the SUVs' exercise(s) of hyperlinks are accorded, at the special server (which may be the ICP/ISP/LNA), a fully customized interpretation.

Accordingly, the related disclosures and this disclosure may beneficially be read together.

2. Particular Objectives of the Present Invention

The present invention contemplates dynamic hyperlink resolution, meaning that a hyperlink—no matter whether initially distributed to a small network community or an entire nation, no matter whether recent or aged, and no matter with what (hyper) video "hot spot" ostensibly associated—is not an invariant, inflexible and unchanging link to, at all times and by whomsoever exercised, a link to the same network location, nor to the selfsame identical network resource, but that, instead, the same hypervideo hyperlink, as and when exercised by each separate subscriber/user/viewer ("SUV") is differently interpreted by a special server dependent upon (i) which SUV, exactly, is believed to have exercised the hyperlink, (ii) the economic and/or accounts and/or credit status of the exercising SUV, (iii) the previously-expressed preferences of the SUV, (iv) the time of day, week, month or year, (v) the proximate exercise of the same or of related hyperlinks by other SUVs, and (vi) still other factors. After the exercised hyperlink is so interpreted by the special server (which occurs in the background, and without visibility to the SUV), then the SUV exercising the hyperlink is caused (by this special server, and by software processes running at the client SUV) to branch to a network location, or to access a network resource (which may even be a resource located locally at the SUV himself/herself/itself!), in consideration of all the factors of the exercise.

The present invention thus contemplates the custom interpretation and execution of hyperlinks "after the fact" of their creation. This is part of the implementation of full custom hypervideo by the present and related inventions: each and every one of hundreds and of thousands of subscriber/user/viewers upon a digital communications network is, by and large, (i) receiving common, or at most semi-custom, digital hypervideo hyperlinks (in accordance with a related invention), while (ii) any and all actions ("click-throughs") on any hyperlinks are resolved in respect of when it happens, from which SUV it happens, and even in respect of what is happening at other SUVs (i.e., the present invention).

Hyperlinks thus interpreted only when, and if, actually exercised by a specific SUV are thus susceptible of being focused, and targeted, on the particular specific SUV exercising the hyperlink. That is exactly what the present invention does: it makes hyperlinking (within streaming digital hypervideo) specific to (i) the particular place (the SUV), and to (ii) the particular time of the hyperlink exercise, and specific to (iii) still other factors.

Hyperlinks thus interpreted are always timely. Even if an SUV was to exercise a hyperlink in a hypervideo recorded some years previously, hyperlinking that is currently relevant will, in most cases, still ensue. For example, suppose an ancient hyperlink that—when all the numbers of the hyperlink's URL were interpreted—had really once been only a indirect means of accessing a commercial of a local Ford automobile dealership was to be, during the playback of a recorded hypervideo, clicked after the lapse of some years. The dealership may have disappeared or have changed, and the advertisement originally accessible from exercise of the hyperlink may have long since disappeared, but it is entirely probable in accordance with the present invention that encoding of the more significant bits of the hyperlink will always indicate that this hyperlink is somehow related to the Ford Motor Company. Logically a link to a current Ford site, and current a Ford commercial, would be served up to the hyperlink-exercising SUV—even if some particular long past commercial was no longer extant.

Hyperlinks thus interpreted are rationally ordered and responded to in consideration of the interpretation of all other hyperlinks. Logically only some limited, desired, numbers of hyperlink-exercising SUVs can be, and will be, declared "winners" of a contest or a lottery. Logically, no greater number of hyperlink-exercising SUVs will be concurrently sent to particular network site, nor concurrently directed to obtain a particular network resource, than the site or the resource can support; other SUVs being delayed or otherwise routed.

Hyperlinks thus interpreted are flexible. If some particular hyperlink proves popular and often-exercised, then the commercial or other network resource accessed by the hyperlink can be maintained. Any commercial or other network resource that could have been accessed through and by a hyperlink that is never exercised need not be maintained, or may be relocated to be accessed through some hyperlink that is exercised.

3. Dynamic (Hypervideo) Hyperlink Resolution

The present and related inventions go beyond the mere generation, and the network distribution, of streaming digital hypervideo, and custom hypervideo. The present invention, in particular, permits that responses to any "click-through (s)" made on any hypervideo link(s) by each and every separate SUV may be fully customized. Moreover, these customized responses may be in consideration not only of static or semi-static data such as who the responding client SUV is, and what is known about him/her, and what time of day and day of the week it is, etc., etc., but responses may also be dynamically formulated in consideration of the "click-throughs" made on hypervideo links by all the SUVs collectively. In other words, the present invention helps to empower hypervideo by acting on hypervideo link requests in a broad, substantial and versatile manner.

The manner in which the present invention works as is follows. Although hypervideo may potentially be sent from the network hypervideo server to as few as just one (watching) client SUV, the hypervideo, with its embedded hyperlinks, normally goes out to many client SUVs in common as a "multicast". The hyperlinks may be inserted by the ICP, or by the video server, or by the ISP in consideration of the local community or group receiving the hyperlinks (within the hypervideo), the time of day, etc. For example, hyperlinks that are (i) suitable to the perceived demographics of the (digital network hypervideo) audience, and/or (ii) localized to link (ultimately, indirectly, as next explained) the commercials of a local merchant, may be "served up" to some portion of the network audience in common. However, the upstream hypervideo providers do not normally find it efficient to fully customize thousands of hyperlinks per hour going to each of thousands of individual client SUVs when only an infinitesimal fraction of the hyperlinks will ever be exercised—even though they could so customize each and every hyperlink.

Instead, a single hyperlink at one spot in the hypervideo may be, and commonly is, delivered in common to many, or to all, client SUVs. Instead of leading directly to the ultimate network site, or network resource, that will (ultimately) be accessed by the client SUV if he/she "clicks through" on this hyperlink, the hyperlink instead points to a particular portal of the special server. For example, to use the universal resource locator (URL) notation of the world wide web, the hyperlink might be to http://www.specialserver.com/car_ford_ad_40. The client SUV does not normally see this URL, nor exactly care what it is. The URL may in fact be nothing but numbers, and may effectively be indecipherable as to exactly what response might be expected to be forthcoming from any exercise of the URL.

As the sample URL suggests, a car advertisement from Ford (the fortieth one of such) is to be expected from the client exercise of the sample hyperlink. But what advertisement, exactly? This is where the special server combines the (i) identity of the responding client SUV with (ii) pre-existing data bases (that are in part maintained from collected responses) so as to deliver to the responding client SUV not, most commonly, the final resource (the advertisement) but, instead, most likely, another URL pointing to the advertisement. For example, if the client SUV clicking on a Ford motor car hotspot is from a poor neighborhood, and/or has shown a proclivity for austerity in consumption and/or automotive consumption, then an advertisement for a less expensive Ford automobile, and/or possibly one extolling economies of vehicular operation, might be linked for and to this particular client SUV. Conversely, if the client SUV clicking on a Ford motor car hotspot is from a rich neighborhood, and/or has shown proclivities for conspicuous consumption and/or automotive consumption, then an advertisement for a luxury Ford automobile, and/or possibly one extolling the prestige of Ford ownership, might be linked for this particular client SUV. Clearly still more subtle distinctions are possible. This is called "targeted advertising", the benefits of which are well understood.

Accordingly, the special server acts to "hand off" the client SUV to a target destination/resource. This is commonly done by sending back to the client SUV a very, very short and fast message containing a URL. The client SUV will then go out on the network to retrieve the resource at this URL, wheresoever it may be and howsoever long it may last. There is, of course, the possibility that the responding client SUV (i) cannot reach the special server, or (ii) is exercising an obsolete link portal, such as might occur if the client SUV is exercising a hyperlink on hypervideo recorded some weeks, months or years previously. There are many ways to deal with this situation, starting with the use of quite general portals (e.g., the http://www.specialserver.com/car_ford) at the server and continuing with default hyperlinks (e.g., http://www.specialserver.com/default or http://www.isp.com/nolink).

The software processes of the present invention may be present at any "special" service provider receiving, and acting upon, hyperlink "click throughs" anywhere within a (hypervideo) digital communications system. An advertiser pays the special server (and, or course, the ICP/ISP/LNA so that the hyperlinks are present in the first place) not just to receive "click through" traffic, but, particularly in the case of the special server, so as to know more about the persons clicking through. This may be for purposes of, for example, follow-up mailings or e-mailings. Normally the most "intelligence" resides within the SUV databases at the special server, while the network resource providers (the ICP, ISP, and/or LNA) and the advertisers are quite "dumb". An advertiser having a network site (a "web site") may, however, choose to "play" a different advertisement at the same network site depending upon the day, and/or the time of day, at which the site is accessed through a hyperlink.

Accordingly, the special server of the present invention acts on any "click-through(s)" made on any hypervideo link(s) by any SUV in a network hypervideo system so as to first interpret what in particular the SUV wants, and to then, so far as is possible and authorized, to either give it to him/her or, more commonly, to give directions to him/her as to how to get it.

The SUV may want, and may command by making a particular type of click on hyperlink (e.g., with the left mouse button), to branch into a new (hyper)video stream. As long as the new stream is not forbidden to the particular SUV because of content previously restricted (at least at the present time of day) by the SUV himself/herself (such as to control viewing by children), and/or because the selected video stream is pay-per-view and the SUV's account is not in good standing, the SUV will be fed a link to the new video stream (possibly uniquely out of all SUVs!).

Meanwhile, and quite remarkably, the old stream (the "mainstream") is also continued, and is still received and stored (for so long as capacity allows) in the background at the subscriber/user. (See the companion patent disclosure.)

The SUV may alternatively want, and may command by making a particular type of click on hyperlink (e.g., with the right mouse button) or by clicking a particular on-screen control button, to commence recording—which may, remarkably, be done from a retrospective point in time—or to, at a later time, stop recording. The recording will be stored locally for so long as capacity allows, which is typically not long (streaming digital video making voluminous use of memory), and will then be stored remotely upon the network, normally at the supplying ISP. Consider that the recording of the video stream that is being fed to any user is really transpiring all the time, as it is for all the video streams, at the ISP/LNA. (Indeed, if not a "live" video stream, the video stream is normally stored at the ISP/LNA.)

The SUV "click-through" really serves but to send out to the ISP/LNA a first time marker when recording is commenced, and a later time marker when recording is stopped. The SUV does not see, nor sense, this. When he/she goes to replay the recorded video then the stored video is retrieved, either locally or from the common central store, and is replayed to the SUV exactly as if is was a full-custom, or fully locally-stored, recording!

4. The Objectives, and the Capabilities. of the Special Server of the Present Invention in a Network Hypervideo System The network server of the present invention is a software-controlled computer "server" operating in conjunction with 1) a video (or hypervideo) content server (a Network Content Provider, or Internet Content Provider, or simply an "ICP", and 2) a client (a "Video-on-Web VCR", or simply a "VOW VCR") which is described in lot the companion patent application. The software-controlled computer "server" of the present invention is itself commonly called a "Video on Web Server", or simply a "VOW Server".

The objectives of the VOW Server system of the present invention are as follows.

4.1 Multiple Sources of Multiple Hyperlinks all upon the Same Hypervideo Feeds

First, the VOW Server system of the present invention permits multiple hyperlinks from multiple sources to effectively coexist simultaneously within the same hypervideo feed. In crude terms, it permits multiple separate parties to get a "bite" at the SUV. This is because a SUV receives streaming hypervideo within which are imbedded hyperlinks arising from multiple feeds from separate sources. The originator of the hypervideo stream, or network Content Provider, or Internet Content Provider, or "ICP", adds the first hyperlinks. More hyperlinks may be added (by use of the VOW Server system of the related invention) within the same hypervideo stream by a regional distributor, and still more by a local network service provider (e.g., by an ISP or a LNA). If is crassly considered that all hyperlinks are simple commercials—which they need not be—then it is immediately apparent that, as one way of describing the situation, hyperlinks to each of national and regional and local advertisements will constantly be present in the hypervideo received by each SUV.

4.2 Customized Hypervideo. Both Overt and Covert Via Exercised Hyperlinks

Second, the VOW Server system of the present invention acts as a tool for the insertion of customized hypervideo commercials both overtly and covertly in the hypervideo feed to each particular SUV. It will be understood that each SUV is receiving (network digital) video (hypervideo) on demand, and need not, and commonly is not, in synchronous sequence with any other SUV.

Moreover, in accordance with what providers at all levels want to send to a particular SUV—be the differential delivery be based on anything from crude demographics to an exacting personal profile of the individual SUV—the particular SUV will receive a variously customized regimen of both overt and covert commercials. Overt commercials are those that appear unless the SUV makes some effort, such as "fast-forward" or branch on link, to avoid them. They are analogous to commercials on commercial broadcast television.

The covert commercials are those that are present behind the hotspots and associated custom hyperlinks (which need not be exercised) that are presented to each SUV. Note that for either and all types of commercials the SUV may, and commonly does, branch on the network (at least temporarily) from a video (or hypervideo) stream originating at the ISP/LNA to another stream also originating at the ISP or the LNA acting as the commercial provider. In other words, when a particular SUV is presented a commercial from the Ford Motor Company, then he/she may have gotten the commercial from any of (i) the ICP, (ii) the ISP or the LNA, or (iii) even upon the communications network (nominally, the Internet) from some site (some Universal resource locator, or URL) at the Ford Motor Company, and not from any network content or service provider! Quite simply, commercials can, in accordance with the principles of network communication, come from almost anywhere.

The principle challenge is not how to deliver commercials, nor, for that matter, hypervideo itself. The main challenge is how to deliver commercials intelligently, and to good effect, without alienating the SUV from the commercials, or, in extreme cases, the medium (the digital communications network) of their transmittal.

4.3 Dynamic Hyperlink Resolution as Supports, Inter Alia. Network Lotteries and Coupons Distributions Third, the seeded hyperlinks are resolved at run time. Any and all of the servers along the distribution of the video stream to the SUVs may intentionally insert links that have results that are, to the SUVs and to any individual SUV, any of unexpected, randomized, and/or chance. These links are resolved at run time when a SUV clicks on objects in video (including advertisements), and thereby determines the link destination to which the SUV's VOW VCR agent will go. This process is referred to as "dynamic hyperlink resolution". This concept may be used, among other important purposes, to implement a "lottery" or "coupon" system in commercials in a manner hitherto unseen in either streaming video or television media.

Note that this "dynamic hyperlink resolution" can be implemented in many different ways. A unique hyperlink may be distributed to one, or to a few, SUV. The entire SUV audience may be told to "click on the new Ford" and "if you see a red star then please click through because you have won a new car". The SUV audience is then further told "but if you don't then please click through to see our Fall bargains anyway". (To prevent automated, or hacked, interception of winning "codes" by SUV-installed software filters, the "red star" may be a one-time symbol, or symbol unique to an individual SUV, and not publicly known.) The class of potential winners has thus been identified before the fact (of the distribution of winning "tickets", much like lottery scratch-off tickets).

Alternatively, the class of potential winners may be identified after the fact (much like regular lottery tickets, where the winning numbers are pulled after the tickets are sold). Many SUVs may get (from time to time, and in time rotation) the same hyperlink, where a "caller number 100" will win the car. In this case the network site—the special server—to which all SUVs clicking-through become routed keeps track of SUV responses, and identifies the winner.

4.4 Insertions of (i) Scene Change Points and (ii) Associated Text Annotations. Particularly as Exemplifies that Virtually Any Type of Information Can be Appended to Streaming Hypervideo Fourth, the VOW Server system of the present invention permits that virtually any type of information can be appended, or hyperlinked, to streaming hypervideo at the last, and concurrent with, or even after, hypervideo (with contained hyperlink) distribution.

In accordance with a related invention, (i) pre-determined scene change points, and (ii) the associated text annotations for those scenes, as supplied within the streaming hypervideo. (Text annotations are not hyperlinks, although they may be associated with hotspots and hyperlinks such as, for example, to give an textual explanation of the hotspot and associated hyperlink.) These (i) scene change points and (ii) associated text annotations are of importance in organizing the display of the present and the historical hypervideo, and hyperlinks, by the client SUV, or, more precisely, the "Video-on-Web VCR," software process running at the Client SUV. These (i) scene change points and (ii) associated text annotations are sometimes predetermined by humans—who clearly do not perform this task in real time. This would commonly be the case if the content provider was delivering, for example, a movie. The "scene change points" would be related to major transitions in the movie, and all annotations could be carefully drafted.

However, the (i) scene change points and (ii) associated text annotations may alternatively be determined, and, in accordance with the related invention, inserted into streaming hypervideo, in real time! This would be typical, for example, of a live news transmission. The simplest "scene change points" are readily detectable by machine process from changes in the scene images. The (ii) associated text annotations may be provided by anyone from a stenographer to a voice recognition program to a "canned" schedule of the news program, much in the manner of present-day captioned television. The (ii) associated text annotations can be omitted without deleterious effect other than the attendant loss of the associated information.

Although the (i) scene change points, and (ii) associated text annotations, have a very logical, and elegant, purpose as is discussed in a companion patent application, their importance in the present invention is as an indication of the tremendous flexibility of the VOW Server system of the invention in inserting just about any nature or any type of information whatsoever into streaming hypervideo. Clearly it is equally possible to insert in real time any of (i) captions, (ii) music, (iii) commentary, or (iv) control codes into responses made to SUV click-throughs on hyperlinks within streaming hypervideo by use of the VOW Server of the present invention.

But, consider this: some selected types of hyperlinks and hyperlinking may be made mandatory, and need not be subject to "point and click" by the Client SUV in order that hyperlinking should ensue. This means that the same (i) captions, (ii) music, (iii) commentary, or (iv) control codes may be, by use of the present invention, effectively inserted into, or linked so as to effectively become within, streaming digital hypervideo after the fact of the multicast of this hypervideo.

This is exactly how (hyper)steaming video is enabled to incorporate functions taken for granted on (modern) television. For example, an uneliminatable unavoidable always-exercised hyperlink to a possible, sometimes present, severe weather warning (i) message, and/or (ii) a warning tone, may be inserted. The steaming hypervideo receiver is then (to the extent that it runs through these mandatory hyperlinks) always a "weather radio"; it simply gets a null message, completely opaque to the SUV, most of the time. If a real emergency arises no (hyper)video nor any hyperlink needs to be suddenly inserted into the hundreds of different (hyper)video streams being watched by the thousands of SUVs; hyperlinks already leading to previously dormant messages may already be present. When the emergency arises, the hyperlinked message on some message server becomes no longer dormant, and "plays" at the SUV.

Video (hypervideo) presentations—such as, for example, of a state funeral—may be "back dropped" with (iii) commentary both audio and/or textual, which commentary may be viewed and/or heard or else suppressed by SUV preference.

Still further for example, a (iv) logic bomb—which for all digital technologies is in fact no more than simple programmed directives—may be sent to a non-paying SUV.

Each of these separate scenarios, for separate purposes, is worthy of considerable though and analysis. Suffice it to say only that there is some "control", and potential control, going on over the network and inside the streaming digital hypervideo. This quite unlike the world wide web, where each client with his or her browser goes when and where lie or she will, willy nilly. Instead, there is some degree of directivity, and potential latent directivity, "built in" to the delivered hypervideo.

4.5 Security in Networked Distribution of Streaming Hypervideo

Fifth, the VOW Server system of the present invention supplies security information to the client, or the "Video-on-Web VCR". Such information may include whether or not a particular SDV has the authority to record a particular clip or not, or whether or not the SUV can jump to a particular clip via a hyperlink or not. This is similar to, but distinct from, the prior art pay-per-view situation where the remainder of a show can't be seen unless paid for.

As with the dynamic hyperlink resolution, the security information may be qualified either, or both, before and after the fact. Consider the following example. The "Jones" household with children has registered with its network service provider to decline notification of any "R"-rated pay-per-view offerings. When an advertisement for such an offering, or a hyperlink to a preview of such an offering, is issued out to SUVs in the SUV base, the "Jones" household will not receive either. The "Jones" household will, however, receive an advertisement and/or accompanying hyperlink to a "G"-rated pay-per-view offering. Alas, the hyperlink leads, again by prior-stated preference of the Jones household, not to the preview, but rather to a security filter requiring entrance of a password. Little "John Jones", not having the password, might as well keep on with his (streaming hypervideo) lessons. Big "Jack Jones", John's father, has the password and enters viewing of the preview. When after viewing the preview, however, "Jack Jones" decides to immediately partake of the pay-per-view offering, and clicks through in an attempt to do so, then the pay-per-view server knows from comparing Jack's entrance code—previously provided uniquely to Jack's server one time at the earlier start of the preview—to the credit list for all codes that Jack has not paid the Jones's last bill, and must receive a dunning message instead of the desired pay-per-view offering.

The considerable importance of the present invention in the context of security is a follows. A capability for strong positive transactional control is clearly inherent in any network transaction where each party is certain as to who, and only who, is at the other end of a communications link. At the present time, this control is established by forming a point-to-point secure link, typically encrypted, the security of which link is valid only so long as the link is maintained. (These links are typically presently used in Internet commerce.) The problem arises when, in the world of the nearly infinite branching possibilities of hyperlinks, a security feature must be offered or enforced at a time later than, and possibly very greatly later than, an occurrence upon which the security function will be predicated.

The basic solution to this problem is what cryptologists refer to as the "one time pad". Party A gives party B a unique number which is good to transmit (or to predicate) information in the future but one time only. Once the unique number is used once for information transmission from B to A, then it is forever discarded.

In the context of streaming hypervideo, the implementation of a one time pad is straightforward. For each and every network security event prospectively in the future to be presented—and even those events that will never be, in fact, broached by every SUV—timely issue to each individual SUV a unique number (which may, but need not be, be in form of a unique URL) for each event. If the "right" SUV in the future comes to have the "right" number, then a security filter is satisfied, and not otherwise.

The challenge is clearly to give every single SUV a stream, which may be a copious stream, of unique numbers. Generation and management of the numbers is no big problem; distributing them to the SUVs is. This the present invention makes possible.

4.6 Monitoring, Accumulation, and Use of User-Subscriber Information as Represented by User-Subscriber Click-Throughs Sixth, the VOW Server system of the present invention permits the gathering, and the accumulation, of valuable information regarding each SUV entity, regarding SUVs by groups that are regional or otherwise, and by all SUVs taken together. This is accomplished by recording SUV click-throughs and using this recorded information to develop both personal, group and collective SUV statistics.

These and other aspects and attributes of the present invention will become increasingly clear upon reference to the following drawings and accompanying specification.

BRIEF DESCRIPTION OF THE DRAWINGS

FIG. 3a is a block diagram of the production of hypervideo, containing both (i) hotspots and (ii) associated hyperlinks, at an authoring station in the content provider (shown in FIG. 1) the preferred embodiment system of the present invention.

FIGS. 3b through 3d are block diagrams of the control and data exchange between the VOW Server/Internet Service Provider and the Client SUV in the preferred embodiment of the present invention.

DESCRIPTION OF THE PREFERRED EMBODIMENT

Figure 1:
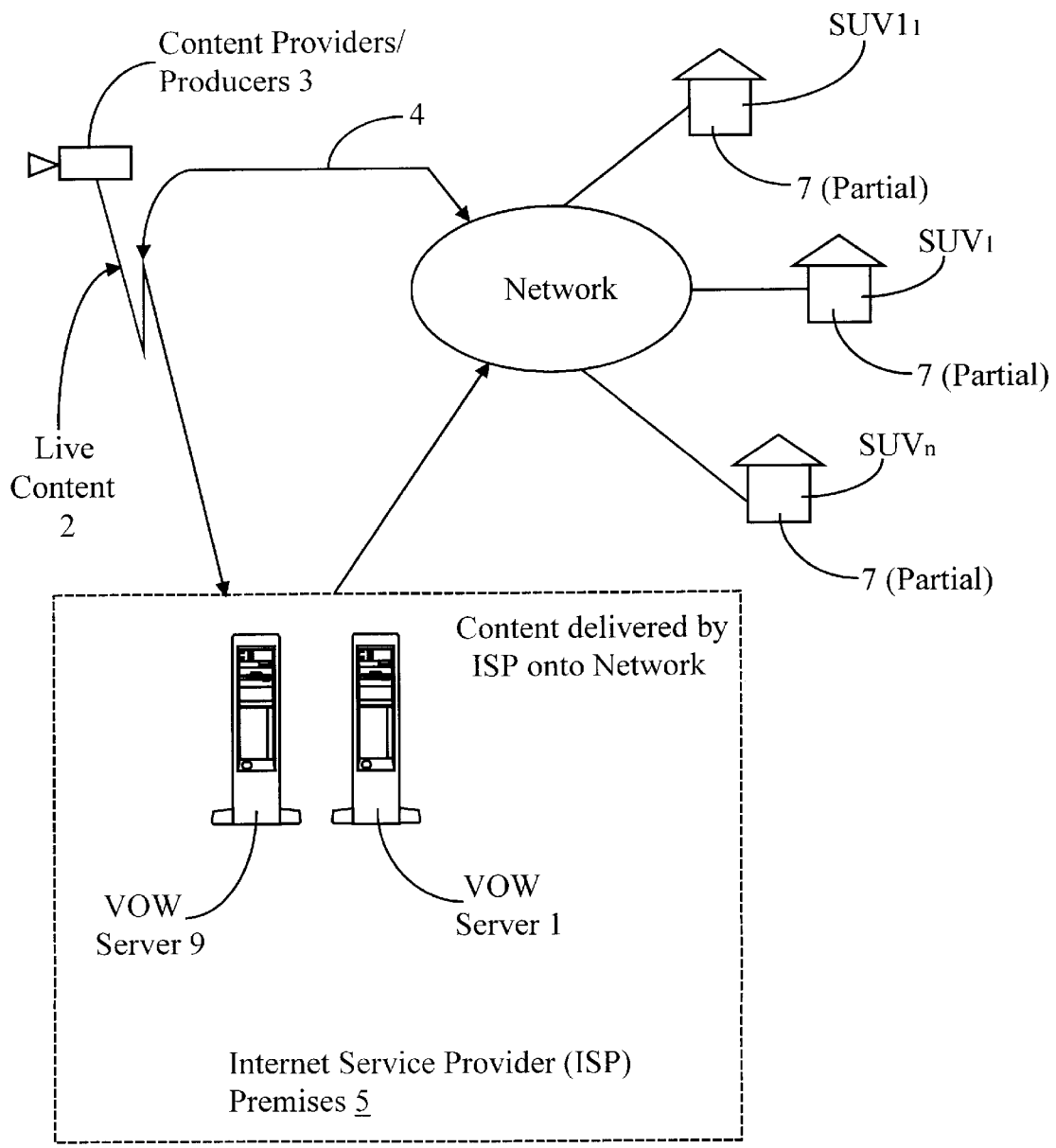
FIG. 1 is a diagrammatic view of the origin and transfer of digital video/hypervideo data upon a digital network to multiple subscribers/users/viewers (SUVs), including through, by way of example, an Internet Service Provider (ISP) or a Local Network Affiliate (LNA) acting as the essential special server, or VOW Server, where hyperlinks within hypervideo are resolved in accordance with the present invention.

1. Context and Environment of the Present Invention

It being assumed that the SUMMARY OF THE INVENTION section of this specification has been read, this first paragraph of this section focuses on the larger systems environment in which the special server, and the dynamic hyperlinking processes, of the present invention, are operative. The present and related inventions contemplate computer systems and software tools that can automatically: 1) analyze an incoming stream of video for scene changes in real-time; 2) cut/copy/paste from/to the video, including so as to insert hotspots over inserted hyperlinks, thus making hypervideo; 3) delivering the hypervideo upon a digital communications from a hypervideo server to clients, whereupon the clients may "click on" hotspots in the moving hypervideo to hyperlink; 4) resolving the clients' hyperlinking at a special network server so that 5) the clients may ultimately branch as desired between network resources including hypervideo, 6) recording as desired any sequence thereof so as to build as desired a mosaic or album of interesting scenes. The present invention—which more particularly concerns functions 4) and 5)—is thus but one aspect of a more extended system, and concept.

The overall system could be called, and considered to be, "full performance hypervideo". Such "full performance" not only means that a Client subscriber/user/viewer (SUV) upon the digital hypervideo distribution network retrieves, by and large, the video/hypervideo he or she wants when he or she wants it—much in the manner of "surfing" the sites of the world wide web—but also that some sites or sites upon the network—normally but not exclusively, nor invariably, the Internet Service Provider (ISP)—come to know a great deal more about what, and when, the Client SUV is viewing than heretofore. This knowledge is not gained by any sort of insidious monitoring of the Client SUVs. Instead, it should be recognized that the Client SUVs from time to time identify, and link, to the (hyper)video that each wishes to view. It is simply necessary to set up a network structure where these Client SUV choices can be assimilated, catalogued, and, optionally optimally, acted upon. This the present invention accomplishes; permitting (i) the ready gathering of Client SUV "interest" data as is expressed by "click-throughs" on hypervideo hotspots having associated hyperlinks, and (ii) the use of the cumulative data so gathered to at least partially, and/or from time to time, predicate the issuance of, and/or the branching (linking) in respect of, further hyperlinks later in time. There is thus a trade: the Client SUV, as an inevitable consequence of "surrendering" interest information, permits that this information should be reasonably, and intelligently, interpreted and acted upon so as to shape, if not the future viewing experience for the Client SUV (i.e., for purposes of propaganda, or pandering to Client bias) the future commercial offerings to the client (i.e., salesmanship). The result is generally favorable to both Client SUV and network advertiser: the Client SUV is ultimately absolved of watching "commercial" in which he/she has no interest, or is even hostile, and is instead presented, at least in part, with the focused and targeted information, albeit often commercial information, that busy lives require.

One related invention particularly concerns how, typically, both (i) video and hypervideo clips, typically containing advertising, and (ii) hotspots and associated hyperlinks, which hyperlinks commonly lead to advertising, may be inserted, if necessary on-the-fly, into streaming, compressed (normally MPEG compressed) video. Note that, in the vernacular, both (i) commercials and (ii) hyperlinks to commercial may be inserted, and commonly (at least for sponsored programming), both are. The insertion, and the management, of hyperlinks is separate from, and is different than, and should not be confused with, the fact that video and hypervideo clips may also be inserted as (typically periodically scheduled) commercials within the streaming hypervideo. In accordance with the related invention, both insertions may be done on-the-fly and while the hypervideo is streaming, and compressed (normally MPEG compressed).

Hyperlinks (such as are commonly associated with commercials) are, of course, distinguished from embedded (video and hypervideo) commercials for, inter alia, the fact that an embedded commercial will normally inevitably unfold unless action is taken by the Client SUV—possibly by clicking on a hyperlink!—while hyperlinked commercials will not normally unfold (i.e., be seen) unless specific Client SUV action is taken to click on a hyperlink.

Of course, in the networked real-time world things need not, and are not, always what they seem to be. The classic case of this is the "local" commercial, corresponding to the existing "station breaks" on network television where are inserted commercial messages from the local affiliates. Things get complicated when it is remembered that the video feed to the Client SUVs—insofar as there is one, or ten, or a hundred such—may have come to the ISP by satellite overnight, and the ISP is really both "station" and "network". I should be understood that, in accordance with the present and related inventions, commercials can be "inserted" into network-distributed digital hypervideo, and video, in many places, and at many times—for even the same video content! It is not so much a challenge of how to get the commercials into the network distributions, but how to get them in so that digital networks do not become the "vast wasteland" ascribed to television.

It must in particular be considered that even the "regular" scheduled, commercials, can be accessed by hyperlinks, and hyperlinking! These "regular" commercials would thus be considered to be accessed by hyperlinks which, when arrived at within a streaming hypervideo, have a "default" mode which will cause hyperlinking unless the client does something to the contrary. The client customization ability of the present invention is thus useful in both (i) the "force feeding" the client customized commercials, as well as (ii) the customizing of any information (commercial or otherwise) that the client may volitionally seek by clicking on a hyperlink.

In its ability to manage hypervideo hyperlinks so that hyperlinking is customized, the present invention is of use to TV, cable and internet service providers (ISPs) who provide and/or who insert into streaming video (and hypervideo) advertisements, and/or hyperlinks to advertisements.

The best way of thinking about the present and related inventions is to completely abandon the idea that there is but one information source, and multiple parallel information sinks—as in broadcast television—and to instead realize that upon a digital communications network information flow control may be separated from information content, and that all sorts of information resources are "coming and going" to and from everywhere, and not necessarily concurrently, nor in linear time sequence, between all servers and all clients— much as the Internet functions today.

Network content providers, or Internet Content Providers, and/or ISP's may, in particular, insert "hard", linear, video clip commercials in video/hypervideo of their origination— although even this may not be a good idea if the program content is to be later "re-shown" (a better term for a network may be "reordered outside of anticipated time-of-viewing parameters").

Network Service Providers, or Content Service Providers, and/or ISPs may, in particular, control the immediate video servers from which the network Client SUVs directly obtain video/hypervideo—although certainly not all the same video/hypervideo, nor invariably synchronously, Indeed, some client SUVs are typically delivered multicast video/hypervideo, while others may be completely asynchronous. The video server might be considered to hold and store, for example, 48 hours of programming for 16 channels, delivering any and all on demand of an individual client. The ISP may well desire to "insert" local commercials automatically at scene transitions as video broadcasts flash by (from either live camera feed or video servers), seamlessly streaming out the video/hypervideo with its "inserted" advertisements to the client subscribers/users/viewers of the ISP.

In accordance with the present and related inventions, in order to (i) maximized the network economies of multicasting, while concurrently (ii) delivering custom commercials, commercials may be delivered to the various Client SUVs otherwise watching the same video/hypervideo at slightly different times. Suppose, as an extreme example for purposes of illustration, the network bandwidth is 3× and it requires 1× bandwidth to deliver a video/hypervideo content, and 1× to deliver a commercial. All Client SUVs commonly receive the same multicast video/hypervideo (if multicast, then at the same time) until a scene break near the nine minute elapsed mark. Only 1× of network bandwidth is required. Some Client SUVs then receive 30 second commercial A, and then pick up with the video. Other Client SUVs continue in the program video/hypervideo until near the ten minute mark, and then receive 30 second commercial B, then picking up again with the video/hypervideo. Finally, still other Client SUVs continue in the program video/hypervideo until near the eleven minute mark, and then receive 30 second commercial C. At the conclusion of commercial C all Client SUVs are back "in sync" with a single multicast video/hypervideo. The bandwidth required rose to 3× from approximately nine minutes to eleven minutes, thirty seconds, but was only 1× for other periods. Thus bandwidth is conserved.

Of course, in accordance with the present invention, the "insertion" is not of clips—as was postulated to be the case with the ICP and possibly several other places upon the network—but rather of hyperlinks. The inserted hyperlinks point, of course, to the special server. This special server can be the ISP itself but, for purposes of alleviating congestion, it may also be another, separate, server upon the digital communications network.

Wheresoever physically located, the special server—and the commercially valuable information that accumulates at this server regarding the ISP's clients—is normally controlled by the ISP. However, this special server can alternatively be controlled by something like an advertising agency, and the ISP is simply paid a flat rate for its services as a common carrier, or, at most some fee based on how many and how pliable are its Client SUVs as can be both (i) periodically "fed" commercials, and, wondrously, (ii) occasionally be induced to volitionally access a commercial and even (iii) buy in response to a commercial.

Accordingly, and in accordance with the present invention, hyperlinks that are eventually resolved to link to (typically local, typically focused) commercials are inserted by the ISP, and are resolved by the special server at the running time of the hypervideo tendered each Client SUV. Note that the special server does not, within a reasonable window of some days or weeks, care exactly when this transpires, and exactly when the hyperlink must be, and finally is, resolved.

The commercials ultimately resolved at the special server, and then accessed (from anywhere upon the entire network) by the Client SUV may be (i) static "web pages", (ii) regular video so as to create a relatively non-invasive commercial, or (iii) hypervideos which, although leaving the commercials non-invasive, makes the commercials interactive and potentially exciting for the user. Namely, the user can click in the hypervideo commercial to initiate a web transaction or to make a purchase.

From such feedback as may be gained (typically, but not exclusively, at the special server) by user-viewer(s) "click throughs" on inserted hypervideo commercials, subsequent on-the-fly commercial(s) insertion(s) may to be tuned to local demographic conditions and user profiles, or, preferably, even to an individual user-viewer.

2. The Mechanization of Custom Hyperlinks, and Custom Responses to Subscribers/Users/Viewers Click-Throughs on Hyperlinks The present invention contemplates an interaction between, and a customization of, (i) the resolution(s) of hyperlinks inserted into digital video feeds, and (ii) a subscriber's recent activity in pursuing hyperlinks embedded in hypervideo.

In simplest terms, a particular subscriber may have voluntarily volitionally "clicked through" a video hyperlink (it does not matter whether the hyperlink appears in a program or in a commercial) so as to follow, ultimately and indirectly (in accordance with the present invention) a hyperlink to, by way of example, an automotive manufacturer. It may thus be logically imputed that the subscriber is, at least momentarily, interested in cars, or in a particular car. The automotive manufacturer whose site was visited would logically desire to re-visit the subscriber with commercials. For that matter, other automotive manufacturers, worried that an interested subscriber might be sold an automobile by the competition, would also like to immediately get their advertisements to the attention of the subscriber. This process simply amounts to "striking while the iron is hot".

In accordance with the present invention, a party on the network, normally the special server (which may be, but is not normally, the network communications service provider), "keeps track" of the hyperlink "click throughs" of the subscriber. This much alone is not very profound. However, being able to do something the monitored "click throughs" is.

In accordance with the present invention, (hyper)links to ultimate (i) video clips, and/or (ii) hypervideo clips, and/or (iii) even more hyperlinks, will immediately, and likely nearly incessantly, be seamlessly fed back to a client subscriber/viewer/user once, and, importantly, yet again if (by hyperlinking) the client SUV permits. This concept is important. The special server of the present invention is not only a wise (and a patient, and a tireless, and an ever vigilant) "salesman", it is an incredibly persistent "salesman". A client SUV will tell it that he/she is interested in something just once and will thereafter not likely lack to be furnished information about it again and again.

In the extreme, a client SUV may click but once on, for example, but one auto advertisement in the morning and will thereafter be lucky if he or she sees anything but endless auto and auto dealer advertisements dynamically hyperlinked into received streaming video programming all the day long. This process amounts to "focused advertising".

3. A Server of DiQital Video Clips, Particularly Advertisements

A server of digital video clips, particularly advertisements, can access MPEG streams, available either (i) locally or (ii) by a Universal Resource Locator (URL) pointing to a server of clips (an Internet Content Provider of sorts). The server at which the clip (the advertisement) (optionally) resides may, or may not be, the same Internet Content Provider that provided the MPEG stream, or the same video/hypervideo server that distributed the stream. Normally the server of advertising clips is separate from both. It may be, and commonly is, associated with the advertiser (or his agent, the advertising agency).

Normally, the Internet Content Server that provides the MPEG stream also provides, as part of all of the "price" of receiving the stream, commercials, including embedded hypertext and hypervideo links, that are embedded within the video/hypervideo stream in a manner unavoidable by the Client SUV. This Internet Content Server that provides the MPEG stream still further specifies, and embeds within the MPEG stream, an insertion schedule for insertion of secondary programming within main, user-selected programming. The ISP, and/or the video server, may use this insertion schedule. Any secondary programming—typically in the form of MPEG streams as the user-viewers are typically but poorly responsive to static displays—is again available either locally or remotely as specified by a URL. The insertion schedule typically consists of entries for each insertion instance. Each entry specifies the access path name of the stream to be inserted, and a minimum number of video units after which this insertion can take place.

Both the primary programming (from the Internet Content Server that provides the MPEG stream) and the secondary programming (from the client SUV's Internet Service Provider) can, and typically do, offer the Client SUV a choice of multiple programming channels. The Client SUV can select a channel for ensuing playback from, and within, either the primary programming of the secondary programming. In this regard the Client SUV's control is not much different than television, where a channel can be changed during a show or during a commercial.

Note that the Client SUV-selected "channel", or MPEG stream containing programming, and be another "channel" or MPEG stream, or the same Internet Content Server that provided the first MPEG stream. This is very common. The SUV is offered, or enticed, to go from a more general to a more specific channel, or to go from one providing entertainment and/or education (so as to attract the Client SUV in the first place) to one providing such commercial feed as the Client SUV has, by his channel selection, indicated that he/she is willing to view. However, the successive main "channels" selected for playback at the Client SUV end need not be of the same Internet Content Server. In other words, more that one "network" may sometimes be received on, and from, a single Internet Content Server. Why should this be so? It is because if the SUV's Internet Service Provider does not provide him/her with the "channels" that he/she wants, then the Client SUV will likely soon have a new Internet Service Provider. This various MPEG streams as comprise the "channels" are always available either locally or as specified by a URL pointing to a Content Server.

Accordingly, under processes of the present invention, the Internet Service Provider can feed the Client SUV-selected MPEG stream to the Client SUV for playback. The Internet Service Provider can access, and can initialize for insertion, all secondary streams specified in the Insertion Schedule. The Internet Service Provider can seamlessly insert secondary streams within the main programming stream in the order, and at intervals, specified in the Insertion Schedule, feeding all such streams to Client SUV for playback. The Internet Service Provider can receive requests from a Client SUV to hyperlink to related videos, which are available either locally or are specified as a URL. The Internet Service Provider can access hyperlink video streams, initializing these streams and feeding them to the Client SUV for playback.

On completion of a hyperlink video stream, Internet Service Provider can automatically and seamlessly switch to the earlier playback stream, and can continue sending the new stream from the hyperlink point. The Internet Service Provider can accept successive requests to hyperlink, thus forming a hierarchy of video streams. On completion of a video, the Internet Service Provider can switch and return to playback of the video at the earlier, higher level.

Finally, the Internet Service Provider can reset and initialize all component modules on receiving a close request from the user-viewer.

These and other performance characteristics of the system and methods of the present invention will become increasingly clear with the explanation commencing in the following section 4 of this specification.

4. The Client Subscriber/User/Viewer

In accordance with the present invention, the Client subscriber/user/viewer (SUV), or simply Client, is offered a choice of multiple programming channels. One channel can be, and is, selected for playback. The Client SUV thus conveys back to the Internet Service Provider of the Local Network Affiliate (that is also the Advertisement Server) the primary programming channel selected by the Client SUV for viewing. Immediately the ISP/LNA can tailer the advertisements later provided to (i) who the SUV is (or at least appears to be) and (ii) what the Client SUV has currently chosen to watch.

The Client SUV synchronizes with the ISP/LNA (or Advertisement Server) for reception of the user-selected primary programming channel.

The Client SUV plays back all programming received from the video server an MPEG stream. Additionally, any and all advertisements and messages from wheresoever upon the network received are inserted by the Client SUV into the primary programming channel as received, and are also seamlessly played back.

The computer system of the Client SUV—called a Video on Web VCR, or VOW VCR—can detect video scene changes in real-time; as video is being fetched and played back all scene transitions can be flagged automatically, and boundary frames for a scene noted.

The computer system of the Client SUV can generate a representative frame (also known as a keyframe) for a scene as delimited by its start and its end frames.

The computer system of the Client SUV can cache in temporary storage a portion of video being fetched, and can subsequently playback this video from cache buffers.

The computer system of the Client SUV can start recording digital video from the current play position, as a valid MPEG stream; and can stop recording when desired.

The computer system of the Client SUV can start recording digital video, as a valid MPEG stream, from the start of any scene cached in temporary storage and represented by a keyframe. Recording will continue, saving all video frames in cache as well as any new video frames being stored in cache, until stopped by Client SUV action.

The computer system of the Client SUV can receive and playback hybrid streams—primary programming interspersed with advertisements—that contain hypervideo information.

The computer system of the Client SUV can decode hypervideo information in the hybrid stream, and the (human) Client SUV can mark pre-authored objects of interest in playback video.

The computer system of the Client SUV provides visual cues to indicate an object of interest in a video as "hot" and thus selectable.

The computer system of the Client SUV can take a predefined action when an object of interest has been selected by the (human) Client SUV, typically by act of the (human) Client SUV to simply click on the object. A typical predefined action would be the playback of a different video, or the playback of a different segment from the same video or a connection to an Internet web site using its Universal Resource Locator (URL), or, as is most pertinent to the present invention, a link to a particular, addressable, portal of the special server.

If accessed, the special sever will typically return to the computer system of the accessing Client SUV a video/hypervideo to be played, or, more commonly, a URL pointing to a video-hypervideo to be requested and obtained across the network, and played. Thus the predefined action of clicking on a hotspot will ultimately cause the playback of a different video/hypervideo. If the special server directly issues the "playback" video/hypervideo, then this "playback" video/hypervideo may be accessible to the special server either locally, or through a Universal Resource Locator (URL) or an Internet Content Server.

There is the possibility of (i) no action on a Client SUV click-through to the special server. There may be no connection, or no video/hypervideo nor any further link available at the connection, or the hyperlink may simply intentionally be null.

There is the possibility of (i) delay at the special server in response to a Client SUV click-through. The special server, and/or the network resources that the hyperlink would be resolved to access, or to point to, may be busy. Although Client SUVs are not expected to like greatly delayed responses to clicking on hotspots, it is contemplated that a response can, if necessary, still be issued after some tens of seconds delay. The Client SUV simply continues in the past video-hypervideo stream in the interim.

The computer system of the Client SUV can receive from video/hypervideo server, and can play back, a new video that was selected though resolution of a hyperlink within the original, hybrid, programming stream.

The computer system of the Client SUV can playback a nested succession of videos; each video appears as a hyperlink within the earlier, higher level video. Upon completion of a video, the computer system of the Client SUV can seamlessly continue to playback the higher level video.

On action, the (human) Client SUV can close the connection with the video/hypervideo server and can thus end ongoing reception of the hybrid programming stream.

These and other performance characteristics of the system and methods of the present invention will become increasingly clear with the explanation commencing in the next following section 5 of this specification.

5. System Description

FIG. 1 is a schematic block diagram of a digital hypervideo communication system including the special dynamic hyperlink-resolving server, called a Video on Web Server, or VOW Server 1, in accordance with the present invention. As such, FIG. 1 diagrams the total content delivery environment in which the VOW Server 1 operates.

Live content 2 is produced by network content providers/producers 3, and is delivered onto the digital network 4 by the Internet Service Provider, or "ISP", 5. The content 2 is delivered by the ISP 5 onto what may be considered a high speed communications "cloud" in the form of the network 4, and this content 2 is consumed by client subscribers/users/viewers, or "SUVs", 7, most of whom are typically home SUVs. The ISP 5 in turn receives this content 2 from content providers/producers 3, either live or on stored media. The ISP 5 broadcasts this content 2 as live content or else makes it available in stored format on the video server 9. The VOW server 1 inserts local, rich, interactive commercial content using the dynamic hyperlink resolution and dynamic hyperlinking method of the present invention.

During delivery of content 2 onto the network by the ISP 5, the delivered hypervideo is stored upon the video server 9 and delivered on demand to the SUVs 7. The delivery may be in any part multicast (meaning to more than one SUV 7 at the same time). The delivery is by definition multicast if the hypervideo content is from a live video feed. Hotspots and associated hypervideo links, or hyperlinks, are always first delivered in the streaming hypervideo from the video server 9.

The hotspots and associated hyperlinks, which are typically links to advertisements or advertising-related promotions (directly, or indirectly in accordance with the present invention the explanation of which is ensuing) may be inserted either into stored, or into live, video content 2. Of course, if inserted into live video then the hotspots and associated hyperlinks have to be so inserted in real time. A companion patent application for REAL-TIME TARGETED INSERTION OF VIDEO CLIPS, HYPERVIDEO CLIPS AND/OR HYPERLINKS IN COMPRESSED STREAMING VIDEO, INCLUDING DYNAMICALLY AT MULTIPLE POINTS BETWEEN CONTENT PROVIDERS AND SUBSCRIBERS IN DIGITAL NETWORKS teaches how this is done. The hot links and associated hyperlinks may be inserted into hypervideo that goes to as few as one single SUV 7, or into hypervideo that is multicast to many SUVs 7 at the same time. In other words, any individual Client SUV may rarely be receiving hyperlinks that are custom (if not also hotspots that are also custom, which is rarer still.) Normally, however, in accordance with the present invention many Client SUVs, especially those linked by geography or demographics or other affinity grouping, will be receiving at least some of the same (i) hotspots and (ii) associated hyperlinks. Note that these Client SUVs need not receive these same (i) hotspots and (ii) associated hyperlinks at the same time. Moreover, and in accordance with the invention presently being explained, an initial receipt of the same (i) hotspots and (ii) associated hyperlinks at each of several Client SUVs does not necessarily mean that, should each "click through" on a hotspot/hyperlink, that each will ultimately access the same network resource.

The connection of the ISP 5, and also the SUVs 7, to the high speed network 4, or, typically, the internet, can be through any of (i) a cable modem network, (ii) a satellite network, and/or a (iii) ADSL (a telephone network).

The SUVs 7 are necessarily connected to the network, typically the internet and more typically the world wide web, through a high-speed link—normally, a cable modem—in order to support video/hypervideo. The SUVs 7 each independently view and interact with the hypervideo (and other video and downloaded content) through a software-based functionality called, for purposes of continuity with the previous acronym of "VCR" (i.e., a Video Cassette Recorder), a "Video On Web Video Cassette Recorder" (although no cassette likely exists), or simply a "VOW VCR". The function of such a VOW VCR is taught in a companion patent application. Basically it behaves like a VCR to play and record video with the added function that it can respond to click-throughs on hotspots to interpret and respond to associated hyperlinks—normally by going out onto the network 4 to a designated URL, and most normally to (some portal of) the VOW server 1.

Figure 2:
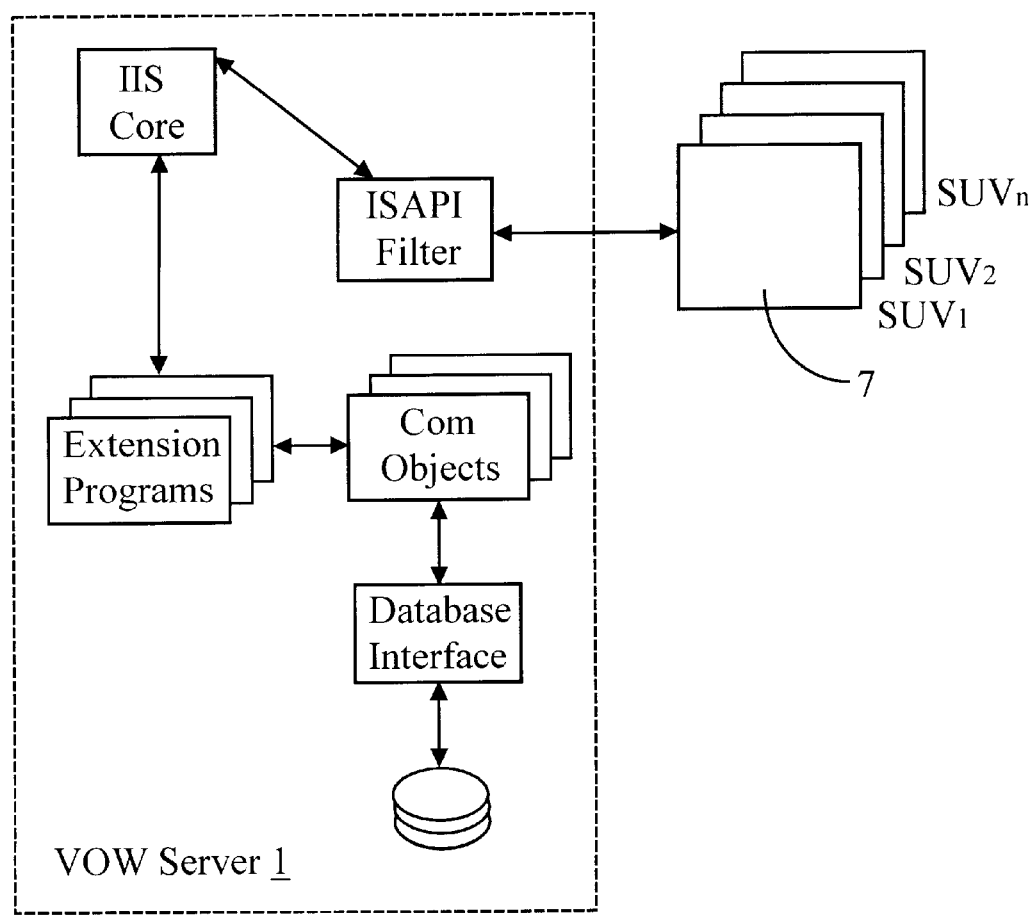
FIG. 2 is a schematic block diagram of the major software components of the VOW Server (as communicates across the network with the Client SUVs) in the preferred embodiment of the present invention.

FIG. 2 shows the flow of events from a software-component-point-of-view of the architecture. The receipt of Client SUV activity triggers the flow. This activity is typically a Client SUV click through but also can be a timed event on the Client SUV side, or an event associated with the playback of video by the Client SUV. The server receives the necessary information such as the Client SUV identification, current stream, current position in the playback and event type and invokes the appropriate sub-program. The VOW Server checks if the appropriate sub-program is loaded and, if required, loads the sub-program and passes the information received from the client. The sub-program in turn passes the information to the appropriate COM object which performs the core processing by looking up the database and also, if necessary, updating it.

A block diagram of the production of hypervideo—containing both (i) hotspots and (ii) associated hyperlinks—at an authoring station in the content provider (shown in FIG. 1) is shown in FIG. 3a. This first step involves content preparation. A network content provider 2 (shown in FIG. 1) operates software at an Authoring Station, such as the authoring system of the related patent application, to modify a video stream, the MPEG stream 21, to produce and authored MPEG stream auth.mpeg 22. The authored stream auth.mpeg 22 contains both (i) hotspots and (ii) associated hyperlinks. The (ii) associated hyperlinks are of two types: a 1) first, or static, type and a 2) second, or dynamic, type.

Figure 3D:
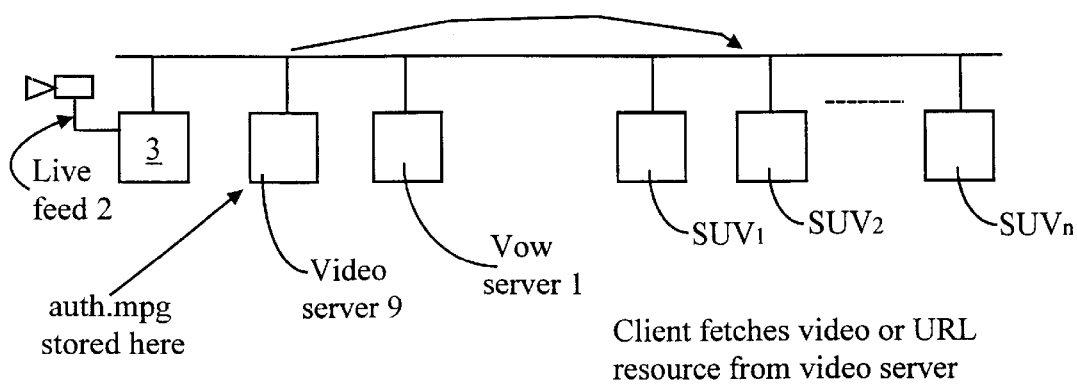

FIG. 3b through FIG. 3d illustrate the basic mechanism of the dynamic hyperlink resolution, and dynamic hyperlinking, process of the present invention.

Referring to FIG. 3b, a second step is content delivery. The client SUVs 7 stream in the video auth.mpg 22. If the link is of type A, client directly goes to the specified URL. If the hyperlink is of the first, or static, type 1), then the client SUV 7 goes directly to the URL specified by the hyperlink. If the hyperlink is of the second, or dynamic, type 2), then the client SUV 7 also goes directly to the URL specified by the hyperlink, but this URL is commonly (a portal of) the VOW Server 1.

Referring to FIG. 3c, the third step is dynamic Hyperlink resolution. The VOW server 1 resolves the link and sends a URL back to the Client SUV 7. It also logs the request.

Referring to FIG. 3d, the fourth step is when the Client SUV 7 fetches the video/web page/slide show using the resolved hyperlink. The Client SUV typically fetches this video or other URL resource from the video server 9, or from yet another site on the network 4.

Figure 4:
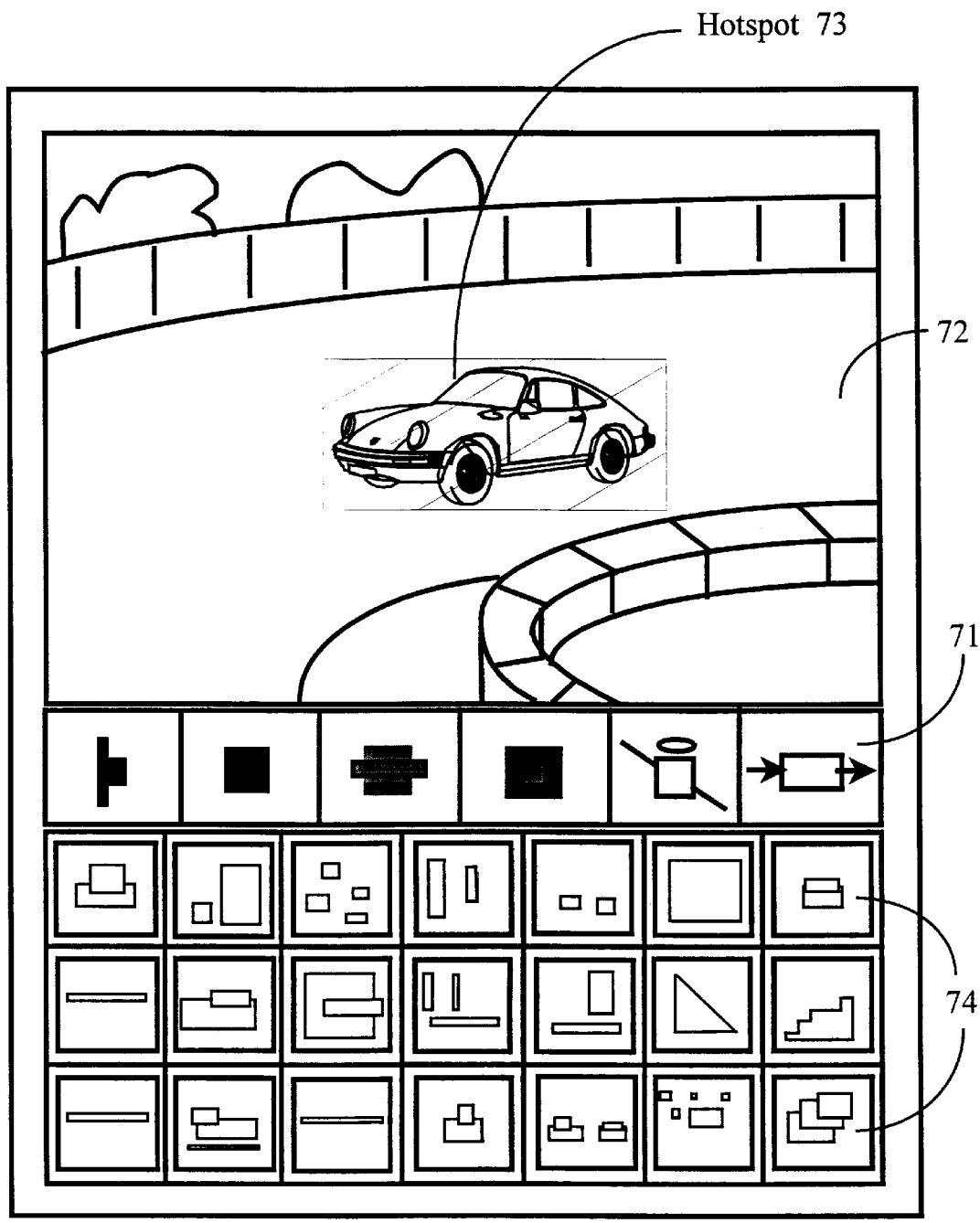
FIG. 4 is a pictorial representation of a screen shot such as might be seen on a monitor of a Client SUV in the system of the present invention, which system was previously seen in FIGS. 1 and 2.

During all this process, and the viewing of hypervideo, the hypervideo is preferably presented at the VOW VCR of each SUV 7 substantially as is shown (for a first, primary, screen out of several potential such screens) in FIG. 4. The manner of realizing this screen, and the associated functionality, is taught within the companion patent application. For the moment, however, it needs only be understood that the "video-on-web" VCR, or "VOW VCR", acts as a web-based playback client through which a SUV 7 can select channels, just as the SUV might with a normal TV, so as to play back hypervideos or just plain videos. In so doing the VOW VCR presents the usual VCR-like controls 71 for video play back including fast-forward, pause, rewind and fast-reverse. The Client SUV 7 uses a simple cursor (not visible in FIG. 4) to control the playing of stored videos, whereas for live videos clicking on an simple play-and-pause control suffices.

When playing hypervideos the VOW VCR displays the main video in one screen, as at screen 72. Hotspots present—and hotspots are neither always nor invariably present—are displayed as is exaggerated, for ease of recognition in the drawing, at hotspot 73. A text annotation (not shown in FIG. 4) preferably appears about the object when the SUV 7 does a mouse-over on the object. These annotations can beneficially serve to impart additional, supplemental, information about the scene and/or the objects in it and/or the hotspot, such as, for example, the identity of a particular person in a depicted group of persons. More commonly, however, the annotation is, or includes, or indirectly links, a Universal Resource Locator, or URL. If the SUV 7 clicks on the hotspot 73 that is associated with a URL directed to the VOW sever—and most are—then the video-on-web VCR (the "VOW VCR") will jump to the VOW Server 1 (shown in FIG. 1).

Third, the SUV 7 can click on a record button, and can then record the video starting at the current frame locally on his hard disk or other media provided that security privileges allow him or her to do so.

In so performing the VOW VCR display thumbnail images 74 of scenes which have been defined and delineated at the video server 9. See the companion patent application.

In the case of "canned" video, these scene changes may well have been manually detected, and the scene change boundary markers long since inserted by an editor sitting at a console so as to annotate the video not in real time. In the case of "live" video as is typical of, inter alia, news broadcasts, the scene change boundaries are automatically detected at the video server 9, and the associated hyperlinks (if any, and which may be sparse in number) inserted much in the contemporaneous manner of a court reporter, or of a translator. The inserted hyperlinks may be less numerous, less well focused, less wide-ranging, and/or less versatile in a live video feed. For example, consider a newscast, and particularly the newscast sports segment. A (network) broadcast "station" employee at a computer station has readily to hand certain hyperlinks to baseball, football, basketball and hockey—if only to the league web sites where the team scores are posted. As the sports commentary and/or sports scores unfold in the live videocast, minor link insertions by this employee serve to "hyperlink annotate" this portion of the news.

At any time about twenty-one most recent such thumbnail images 74, representing twenty most recent scenes will displayed. When a new scene is detected it enters the lowest corner while the oldest scene is discarded in a first-in, first-out (FIFO) fashion. The video corresponding to these twenty scenes is also buffered in FIFO fashion on local storage. The SUV can click on any of the scenes to start recording from that scene. The implication of this is that the SUV can record video which has gone by; such as a sports action shot or a talk-show dialogue.

Returning to FIG. 1, the premises of the ISP 5 typically contain both (i) one or more video server 9 and (ii) the VOW Server 1. Either server can, of course, be physically located elsewhere on the network 4.

Figure 5:
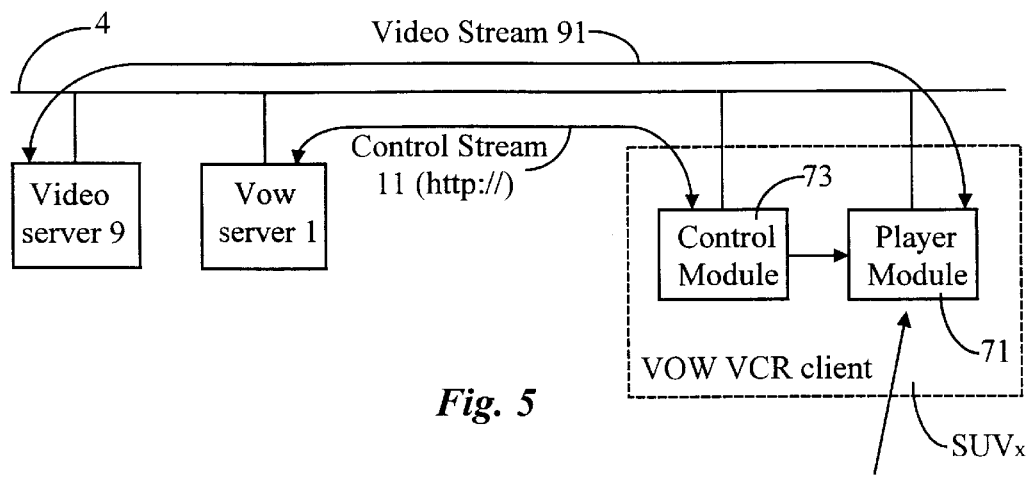
FIG. 5 is a schematic view of the architecture of a portion of the preferred embodiment of a system in accordance with the present invention (as was previously diagrammatically shown in FIG. 1), the portion including 1) a video server, 2) a network "video on web" control server (the "VOW Server") which is commonly, and by way of example, located at a network service provider (the "ISP"), and 3) multiple "video on web VCRs" ("VOW VCRs") of Client subscribers/users/viewers ("SUVs").

A schematic block diagram of the architecture of a portion of the preferred embodiment of a system in accordance with the present invention (as was previously diagrammatically shown in FIG. 1) is shown in FIG. 5. This portion includes (i) the network content provider 2, (ii) the network "video on web" control server, or VOW Server 1 which is commonly physically located at the ISP 5, and (iii) the "video on web VCRs", or "VOW VCRs" of the client SUVs 7, and (iv) the network 4. The video stream 91 originates at the video server 9; the control stream 11 at the VOW Server 1. Both streams 91, 11 are synchronized, and are received at the VOW VCR of a client SUV 7. More particularly the video stream 91 is received at the player module 71 of the VOW VCR of a client SUV 7 while the control stream 11 is received at the control module 71 of the VOW VCR of a client SUV 7. Both player module 71 and control module 11 will be understood to be software functions.

Figure 6:
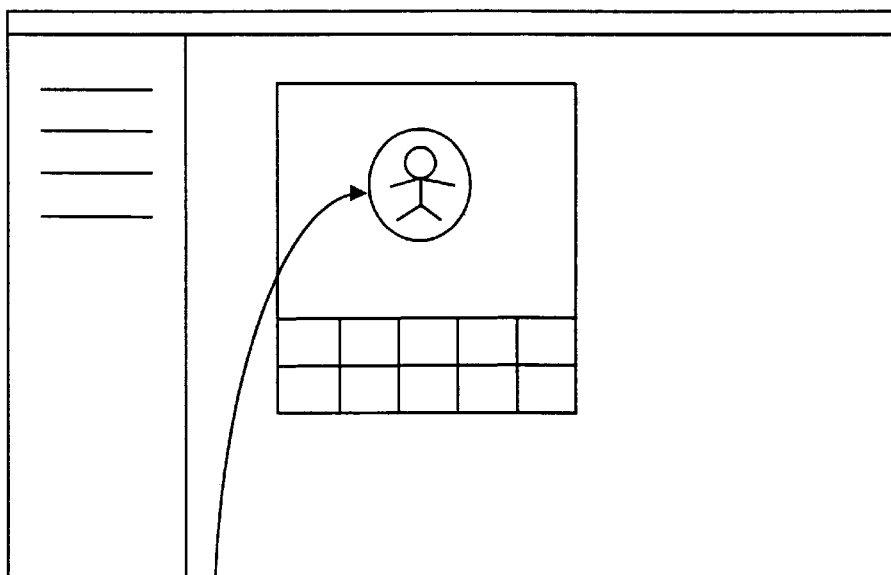
FIG. 6 is a diagrammatic view illustrating that a Client SUV whose VOW VCR is playing hypervideo may click on a hotspot to branch to a network page display, or "web page".
Figure 6:
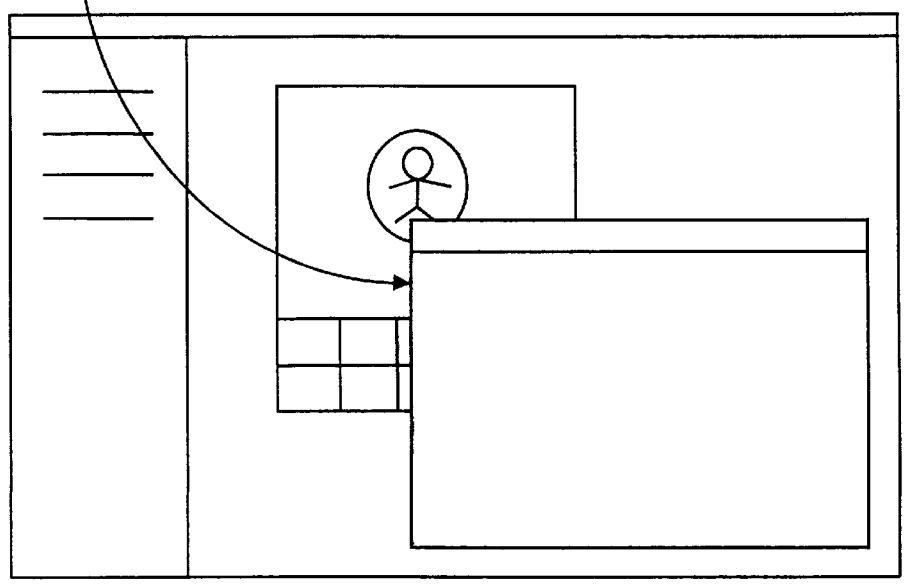

A diagrammatic view illustrating that a Client SUV whose VOW VCR is playing hypervideo may click on a hotspot to branch to a network page display, or "web page", is illustrated in FIG. 6.

Figure 7:
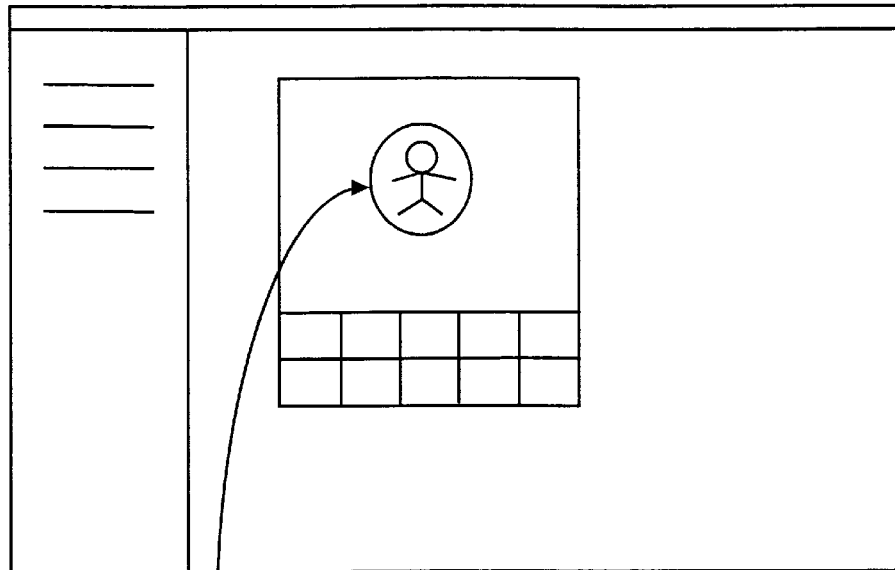
FIG. 7 is a diagrammatic view illustrating that a Client SUV whose VOW VCR is playing hypervideo may click on a hotspot to alternatively branch to another video, or hypervideo.
Figure 7:
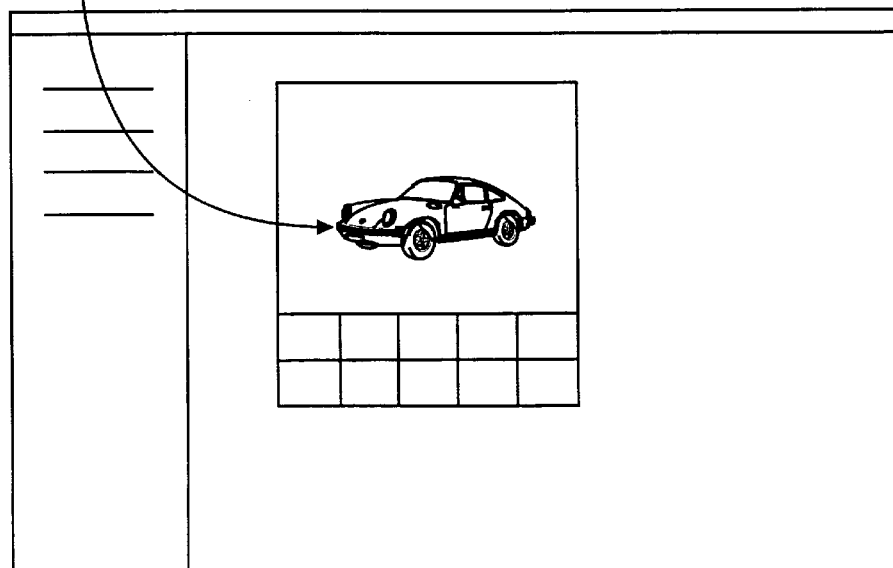

Likewise, a diagrammatic view illustrating that a Client SUV whose VOW VCR is playing hypervideo may click on a hotspot to alternatively branch to another video, or hypervideo, is illustrated in FIG. 7.

Figure 8:
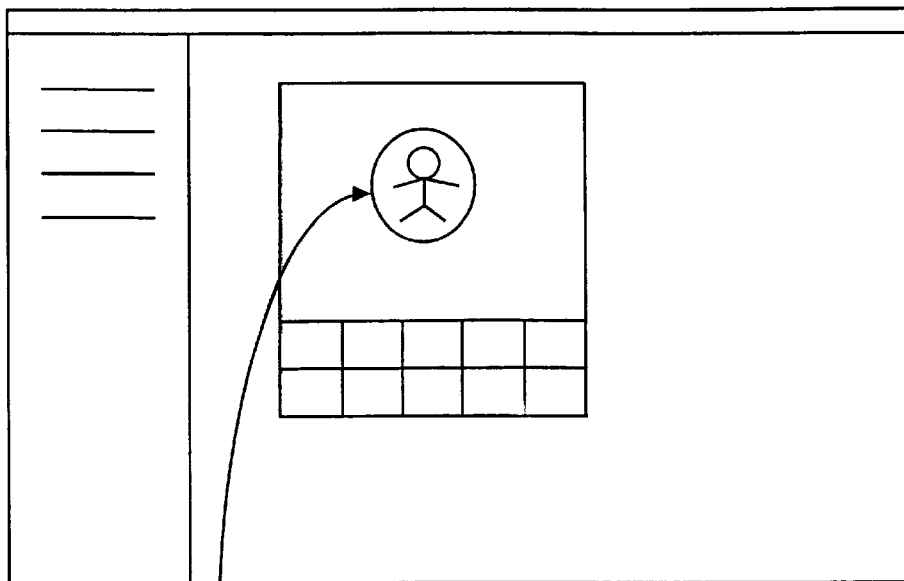
FIG. 8 is a diagrammatic view illustrating that a Client SUV whose VOW VCR is playing hypervideo may click on a hotspot to alternatively branch to, by way of example among many different network resources two of which have already been diagrammatically illustrated in FIGS. 6 and 7, a slide show.
Figure 8:
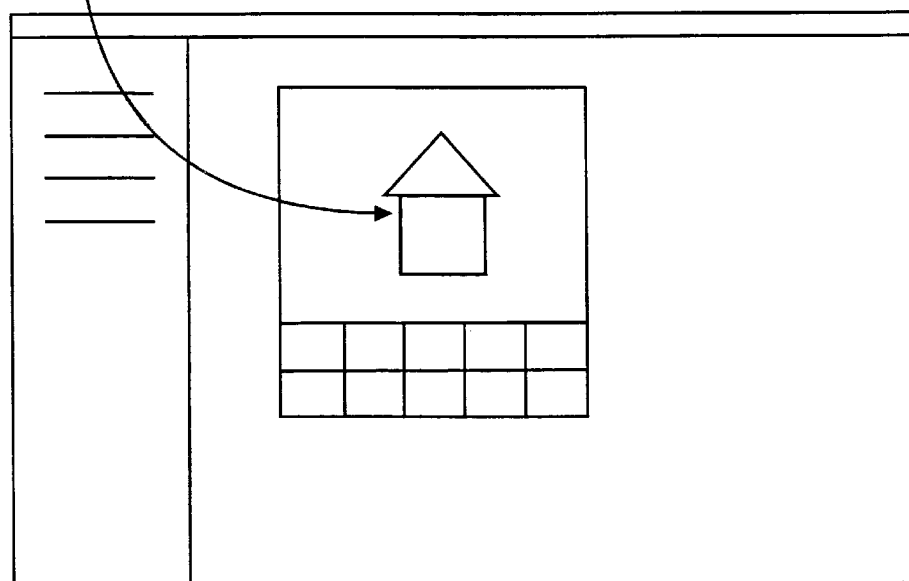

Finally, a diagrammatic view illustrating that a Client SUV whose VOW VCR is playing hypervideo may click on a hotspot to alternatively branch to—by way of example among many different network resources two of which have already been diagrammatically illustrated in FIGS. 6 and 7—a slide show is illustrated in FIG. 8.

Figure 9:
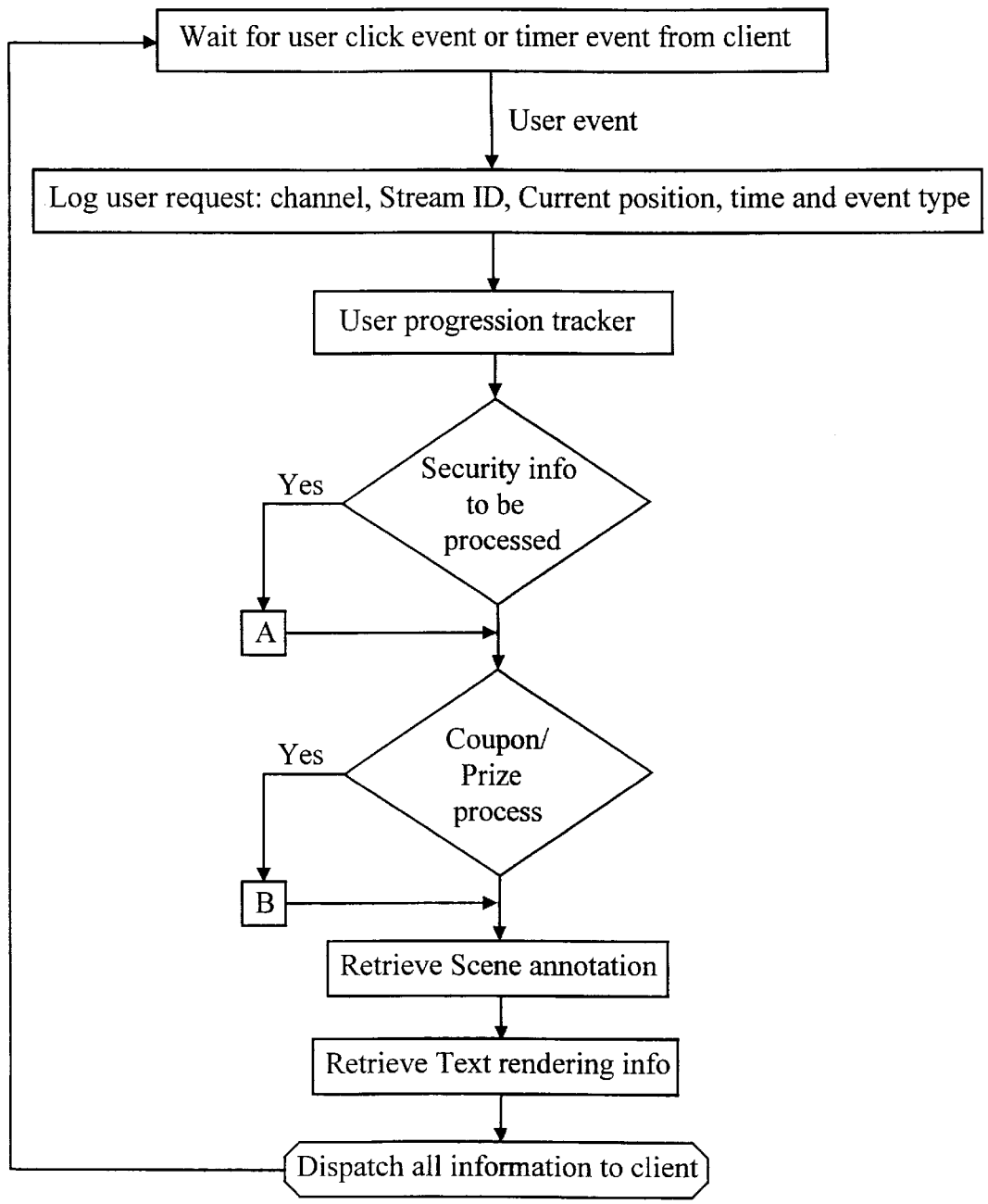
FIG. 9 is a top-level software flow chart of the VOW Server of the present invention, by which software a Client SUV hyperlink "click-through" request is dynamically resolved.

A top-level software flow chart of the VOW Server of the present invention, by which software a Client SUV hyperlink "click-through" request is dynamically resolved, is shown in FIG. 9.

Figure 10:
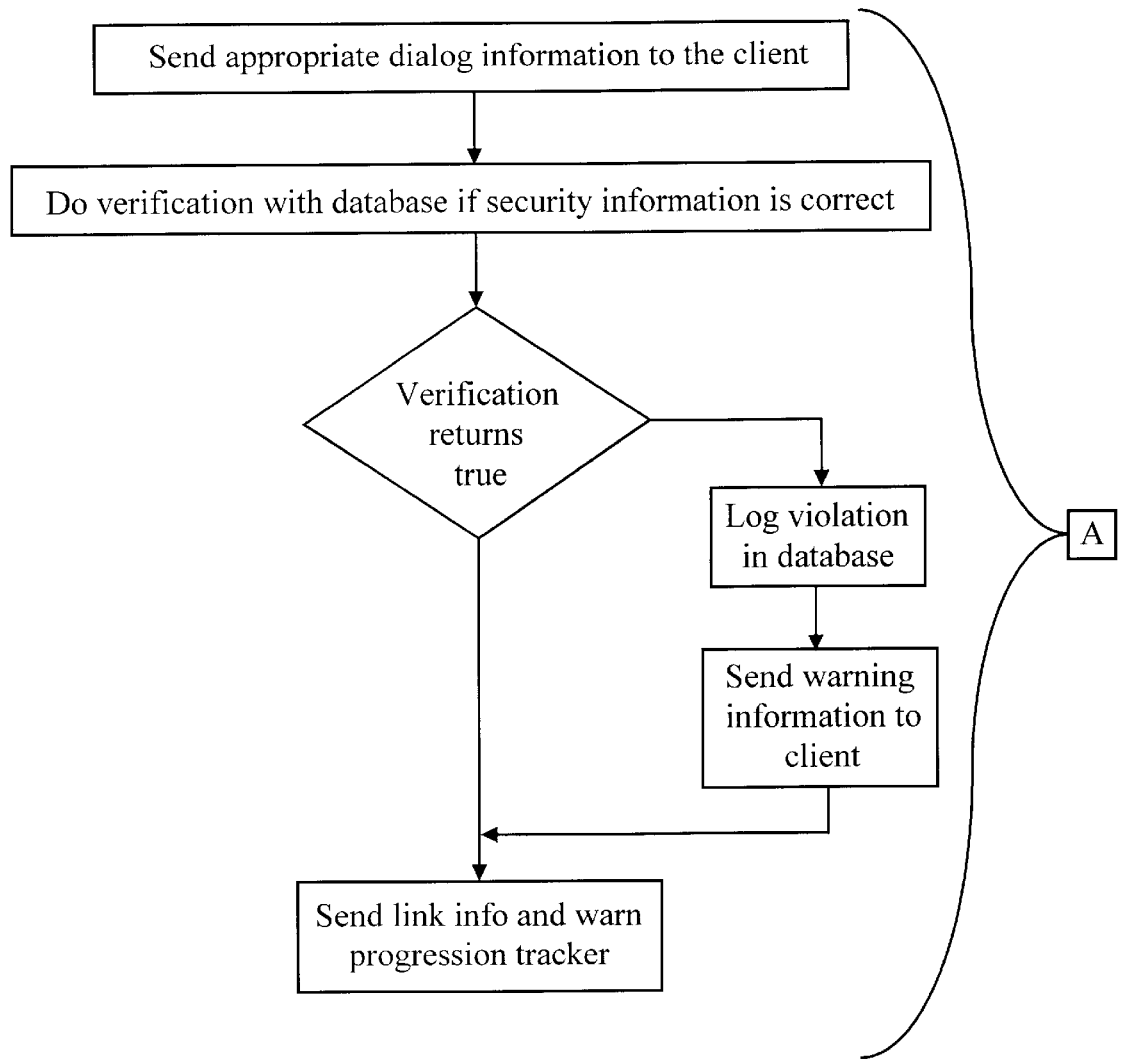
FIGS. 10 and 11 are second-level software flow charts of the sequence of processing the Client SUV hyperlink "click-through" request in the VOW Server of the present invention.
Figure 11:
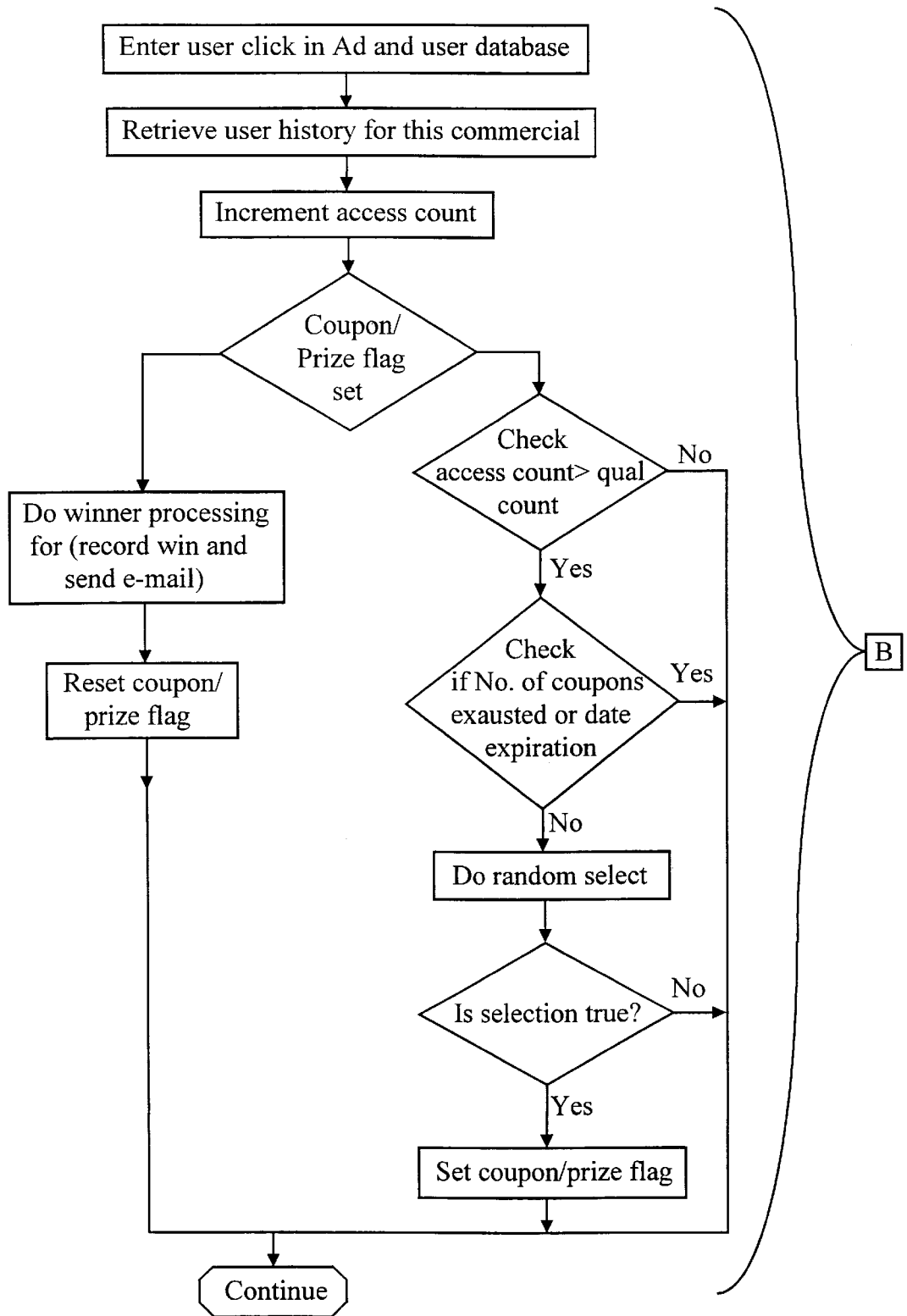

Second-level software flow charts of the sequence of processing the Client SUV hyperlink "click-through" request in the VOW Server of the present invention are shown, respectively for the processes "A" and "B" identified in the top-level flow chart of FIG. 9, respectively in FIGS. 10 and 11.

FIG. 9 shows the overall flow in the main branch of processing. The information from the client is passed on to the user progression tracker module which is responsible for keeping track of user navigation in hypervideo click-throughs and playback status of the user. The progression tracker "follows" the user when he navigates through hypervideo and takes decisions about which links have to be supplied next to the user by calling various processing modules. It is mostly an entity which depends on time and determines if the user is currently watching a commercial, if so, for how long, whether the user has paused the video and if so for what duration, and so on. There are two main special actions that the progression tracker can take apart from the main function pertaining to advertisement servicing. They are: a decision to award a prize or coupon to the user or a security decision (or branch, both of which are described in subsequent paragraphs). The main branch then continues to retrieve the next set of commercials and their associated links (including a prize winning coupon link if told to do so by the right branch). The main branch checks if any scene annotations need to be conveyed to the user, then checks for text information to be rendered and then dispatches all this control information (including the list of commercials) to the user.

FIG. 10, or the branch "A" processing occurring in the main loop of FIG. 9, shows how the hotspot linking is used to control security and access to videos. In this case, the access is of a 'blocking' type—in the sense the client does not proceed until it has an answer from the VOW server or the user cancels the access. This feature is mainly used for controlled access to videos and for commercial purposes—including e-commerce transactions and implementing pay-per-view schemes. In controlled access scenarios it is mainly used to restrict child access to restricted adult material. The branch "A" is entered when a security or e-commerce type of click is received. The server proceeds to retrieve the security information initiates a dialogue with the client. If validation returns an affirmative answer, the server proceeds to give the links to restricted videos along with access keys. A similar situation occurs if the access is to a pay per view video. If the click is on a e-commerce transaction, the necessary steps to complete that transaction are completed.

FIG. 11, or the branch "B" processing occurring in the main loop of FIG. 9, outlines the decision to award a user a coupon or prize when he/she clicks on a hotspot in the commercial. Essentially, this module keeps a count of the number of times the user accesses the particular commercial. If the count is greater than a certain value it qualifies the user for a selection (which might be a random or may employ any other scheme awards that user a prize or coupon. The count is also recorded in the database to give the advertiser statistics on the number of user accesses to his commercial.

This mechanism will also be used to award or inform or take some special action when the user clicks on a non-commercial hypervideo. If the flag has already been set i.e in the left branch of the figure, the win is recorded and an e-mail or other suitable is employed to make the user aware that he has won a coupon or prize. In the right branch of the figure which illustrates the process when the access flag has not yet been set. What happens in this branch has been summarized in the preceding paragraph.

Thus FIG. 1 has shown a block schematic of the video server, the VOW server, the client and the network on which these components are connected. FIG. 5 has illustrated the flow of data on the same network 'pipe' from video server to the playback module of the client and the control stream flowing to the control module of the client. Both these streams are drawn or pulled by the respective modules on the client.

The steps starting from the preparation of the authored MPEG stream to actual playback of dynamic hyperlinks have been described. The first step is where objects in video are tracked and marked as hotspots and then associated with hyperlinks which can be either static or dynamic. However, the focus of this disclosure is the concept of dynamic hyperlinks and their use for interactive commercials. When the client plays back the stream, it identifies dynamic links in the stream, co-ordinates with its control module which would have fetched the required links (at playback time) and plays back the appropriate streams from the video server.

This dynamic form of linking, meaning that the link is decided at playback time, is the theme of the present invention. This concept can be used in several different ways, specifically detailed in various parts of this disclosure. The principle focus is the usage of the concept of dynamic hyperlink resolution for (i) timely (i.e., non-stale) delivery of (ii) Client SUV-specific interactive commercials, using the VOW sever as the vehicle for delivery.

The scheme of the present invention opens up new opportunities for businesses to attract new markets in a highly customized fashion, through interactive discount offerings, coupons and prize schemes. In addition, it helps the advertiser to develop statistics on everything from (i) click-throughs of all Client SUVs to particular hyperlinks, to (ii) the click-throughs of some particular Client SUV to particular hyperlinks, to (iii) the ensuing conduct, potentially including on-line purchases and submissions and expressions of interest, of a particular Client SUV is following a particular hyperlink. This is in marked contrast to conventional broadcast television where there is no interactivity with the viewer and/or the viewer's video playback, especially including commercials.

6. Recapitulation of the Invention

This present specification has described hyperlink resolution at and by a special network server in order to enable diverse sophisticated hyperlinking upon a digital network streaming digital hypervideo from a network hypervideo server to network clients. The special server operates in conjunction with (i) a network video server and (ii) a special client called a VOW VCR (which VOW VCR is described in a separate patent application).

The objectives of the present invention, and of the special server, are as follows. It acts as a tool to insert customized hypervideo, normally commercials, in the hypervideo streams that are displayed at individual network Client subscriber/users/viewers (Client SUVs). It serves to resolve hyperlinks at run time, i.e., to process user clicks on objects in hypervideo (including, but not limited to, advertisements) so as to determine the link to which the Client SUV will go to, or a network resource which the Client SUV will access. This process is referred to as 'dynamic hyperlink resolution'.

This concept of dynamic hyperlink resolution may be used to implement, for example, a lottery, a contest, or a coupon distribution. It permits of interactive commercials hitherto unseen in streaming digital video or in television media.

The dynamic hyperlink resolution may be used to supply security information to, and to enforce security restrictions on, the VOW VCR of the Client SUV; such as whether the Client SUV has the authority to record a particular clip or not, or whether he/she can jump to a particular clip on a hyperlink or not. This is similar to a pay-per-view situation where a presentation cannot be seen unless paid for.

Finally, the dynamic hyperlink resolution serves to record Client SUV click-throughs, and to use this information o develop statistics on Client SUVs both collectively and, importantly, individually.

The overall architecture of the system was seen in FIG. 1. The control stream was generated by the special server, called a VOW Server, that qualified and added value to the video stream generated by the video server. Both streams were drawn by each Client SUV, the control stream being synchronized with the video stream. The video stream could either be generated live—such as by an encoder plus a camera system—or could be delivered from secondary storage—such as a hard disk. In general, the video stream contained static information such as the tracked information of objects in a hypervideo stream while the generated control stream contained dynamic information such as the hyperlinks.

The block diagram of the VOW Server was seen in FIG. 6. As stated earlier, the hyperlinks are dynamically resolved in this software function based on which Client SUV is clicking on what hyperlink, and the time of the clicking.

The process of dynamic hyperlinking was seen to be as follows: The Client SUV clicks on a "hot spot" object in the hypervideo, say an "object 1". This action is conveyed back to the VOW Server by the client software, the VOW VCR.

The VOW Server (a software process) sends the Client SUV time and action information to its resolution component. The resolution component uses the data and retrieves an appropriate link to an advertisement, a pointer (link) to a network resource, or a link to a response. The response could be, for example, an announcement of a contest of a lottery result: "you've just won a trip to Hawaii", or "you've won a free dinner for two at the Greek restaurant". A link to an appropriate video, hypervideo or network resource is thus conveyed back to the Client SUV—which the Client SUV sees and uses to decide his or her future course of action.

The control generation module of the VOW Server is responsible for taking in the various SUV actions and generating the control stream based on various data it retrieves from the various sub modules, all as was shown in the flow charts.

Notably, there must have been, and there is, a necessary preparation of hyperlinks before they are available—even in common—to be exercised at the Client SUVs. In particular, a scene change module functions as taught within a related patent application to recognized (in real time!) the scene change boundaries of streaming digital video. The videos stored on the server are indexed in terms of scenes, with a text annotation added to each of these scenes. The VOW Server stores a list for each of these MPEG streams. Each item in the list consists of two fields: 1) one field is the frame number of the scene change point being authored and 2) the other has the annotation (the text string) corresponding to it.

As the VOW VCR software process at the Client SUV proceeds through the video, it will receive, as part of the stream from the video server, the scene change frames and their corresponding text annotations. On the client side the client player (the VOW VCR) displays a thumb nail image of a characteristic (first) scene frame, and further displays the text annotation when the user does a mouse-over on the thumb nail image. A timer module was responsible for timing the insertion of the commercials.

It is thus possible to understand how the hyperlinks come to exist in the first place. Returning now to the functions more directly performed by the VOW Server of the present invention, this VOW Server runs )as a software process) a user data module and advertisement component stored the Client SUV profile and information such as age, sex and interests. This profile and information was used by the advertisement component to select an appropriate commercial for the Client SUV. The user data module and advertisement component also kept track of the commercials clicked by the Client SUV so that overall statistics can be extracted out of the advertisement component as regards the Client SUV behavior for the commercials. The advertisement component was thus responsible for retrieval of the appropriate ad or other response to a particular Client SUV, making its decisions based on the previous data for that Client SUV and also global information. Third party components for this particular advertisement component, if suitable, may also be substituted for this function. For example, Client SUV preferences might be recorded and interpreted based on heuristic, or on fuzzy logic, filters.

In addition, the control stream generation module was able to generate security information for the video stream which controlled whether the video could be recorded or not at the client.

In accordance with the preceding explanation, variations and adaptations of the system and methods of the present invention for real-time targeted insertion of video and hypervideo clips and hyperlinks in compressed streaming video (including dynamically at multiple points between content providers and subscribers in digital networks) will suggest themselves to a practitioner of the digital communications arts and sciences.

In accordance with these and other possible variations and adaptations of the present invention, the scope of the invention should be determined in accordance with the following claims, only, and not solely in accordance with that embodiment within which the invention has been taught.

What is claimed is:

1. A method of resolving hyperlinks present in hypervideo distributed upon a digital communications network, the method comprising:

distributing from a first, hypervideo, network server upon a digital network to each of a multiplicity of network client subscribers/users/viewers digital hypervideo containing hyperlinks that link when exercised to a second, hyperlink-resolving, network server;

selectively exercising at the network client subscribers/users/viewers the hyperlinks so as to cause communication linkage upon the network to the second, hyperlink-resolving, network server;

resolving at the second, hyperlink-resolving, network server all received, selectively-exercised, hyperlinks in consideration of the individual network identities of the hyperlink-exercising client subscribers/users/viewers and, consequent to this resolving, communicating back across the digital network to the hyperlink-exercising and communicating client subscribers/users/viewers linkage information that is not identical for all, but that is instead different for at least two of these hyperlink-exercising and communicating client subscribers/users/viewers; and receiving at the hyperlink-exercising and communicating client subscribers/users/viewers linkage information from the second, hyperlink-resolving, network server, and acting upon this linkage information to access resources upon the network;

wherein the resources accessed by at least two of the hyperlink-exercising and communicating client subscribers/users/viewers are different nonetheless to the fact that the hyperlinks within the hypervideo originally distributed to both were the same.

2. The method of resolving hyperlinks according to claim 1 wherein the interpreting at the second server is so as to communicate back across the network information in the nature of a network universal resource locator to the hyperlink-exercising client subscribers/users/viewers.

3. The method of resolving hyperlinks according to claim 1 wherein, consequent to the receipt of the information at the hyperlink-exercising and communicating client subscribers/users/viewers, the resource is retrieved upon the network.

4. The method of resolving hyperlinks according to claim 1 wherein, consequent to the receipt of the information at the hyperlink-exercising and communicating client subscribers/users/viewers, the resource is retrieved locally, within the client subscribers/users/viewers.

5. A method of resolving hyperlinks present in hypervideo distributed upon a digital communications network, the method comprising:

communicating streaming digital hypervideo containing hyperlinks upon a digital network from a first, hypervideo, server to each of a multiplicity of network client subscribers/users/viewers where at least two client subscribers/users/viewers receive the same hyperlink;

selectively exercising at at least two of the network client subscribers/users/viewers the same hyperlink so as to cause these exercising client subscribers/users/viewers to communicate upon the digital network to, in accordance that the exercised hyperlinks are the same, a same port of another, second, network server;

receiving at the port of the second network server notification of the exercised hyperlink from each of the at least two client subscribers/users/viewers so exercising the same hyperlink;

interpreting at the second server all received exercised hyperlinks in consideration of the individual network identities, known to the second server, of the hyperlink-exercising client subscribers/users/viewers and, consequent to this interpreting, communicating back across the digital network to the hyperlink-exercising and communicating client subscribers/users/viewers information that is not identical for all, but that is instead different for at least two, of the hyperlink-exercising and communicating client subscribers/users/viewers as did exercise the same hyperlink; and receiving at the hyperlink-exercising and communicating client subscribers/users/viewers the information that is different for at least two of these hyperlink-exercising and communicating client subscribers/users/viewers as did originally exercise the same hyperlink, and, consequent to the receipt of this information, retrieving a resource in accordance therewith, the different information leading to different resources so that at least two of the hyperlink-exercising and communicating client subscribers/users/viewers that originally exercised the same hyperlink do not retrieve the same resource but, instead retrieve different resources;

wherein at least some hyperlink-exercising client subscribers/users/viewers, nonetheless to originally exercising the same hyperlink, ultimately retrieve different resources.

6. The method of resolving hyperlinks according to claim 5 wherein the interpreting at the second server the received exercised hyperlinks is further in consideration of additional data individually associated with each of the hyperlink-exercising client subscribers/users/viewers, the identities of which hyperlink-exercising client subscribers/users/viewers are known.

7. The method of resolving hyperlinks according to claim 6 wherein the interpreting is further in consideration of additional data of the nature of demographic data.

8. The method of resolving hyperlinks according to claim 6 wherein the interpreting is further in consideration of additional data of the nature of socioeconomic data.

9. The method of resolving hyperlinks according to claim 6 wherein the interpreting is further in consideration of additional data of the nature of credit data.

10. The method of resolving hyperlinks according to claim 6 wherein the interpreting is further in consideration of additional data of the nature of hypervideo-viewing preference data previously expressed by the individual client subscribers/users/viewers.

11. The method of resolving hyperlinks according to claim 6 wherein the interpreting is further in consideration of additional data of the nature of past hyperlinks exercised by the individual client subscribers/users/viewers.

12. The method of resolving hyperlinks according to claim 11 further comprising after the interpreting:

updating at the second server a database of information concerning past hyperlinks exercised by the individual client subscribers/users/viewers in consideration of the hyperlink just exercised, and just interpreted.

13. A digital communications network distributing hypervideo with embedded hyperlinks comprising:

a digital communications network;

a first, hypervideo, network server distributing upon the network to each of a multiplicity of network client subscribers/users/viewers digital hypervideo containing hyperlinks that link when exercised to a second, hyperlink-resolving, network server;

a multiplicity of network client subscribers/users/viewers upon the network receiving thereupon the hypervideo from the first, hypervideo, network server, and selectively exercising the hyperlinks so as to cause communication hyperlinking upon the network to the second, hyperlink-resolving, network server;

a second, hyperlink-resolving, network server resolving all received, selectively-exercised, hyperlinks in consideration of the individual network identities of the hyperlink-exercising client subscribers/users/viewers and, consequent to this resolving, communicating back across the digital network to the hyperlink-exercising and communicating client subscribers/users/viewers linkage information that is not identical for all, but that is instead different for at least two of these hyperlink-exercising and communicating client subscribers/users/viewers; and wherein the hyperlink-exercising and communicating client subscribers/users/viewers, upon receiving the linkage information from the second, hyperlink-resolving, network server, do act upon this linkage information to access resources upon the network;

wherein at least two of the hyperlink-exercising and communicating client subscribers/users/viewers do access different resources upon the network nonetheless to the fact that the hyperlinks within the hypervideo originally distributed to both were the same.

14. A computerized process performed at a digital communications network server in response to receipt of notice from a particular client subscriber/user/viewer out of many subscribers/users/viewers upon the network to the effect that the particular client subscriber/user/viewer has volitionally selected a hyperlink, the process comprising:

comparing (i) a unique identity of the particular client subscriber/user/viewer who has volitionally selected the hyperlink with (ii) a pre-existing database of information regarding, inter alia, the particular client subscriber/user/viewer; and choosing and providing a response to the particular client subscriber/user/viewer in accordance with the information stored within the pre-existing database of information;

wherein the process is called "dynamic hyperlink resolution": because the response to each subscriber/user/viewer who has selected the same hyperlink is not the same for all subscribers/users/viewers, but is dependent upon the individual one subscriber/user/viewer.

15. The process according to claim 14 wherein the choosing and providing is of a response in the form of universal resource locator.

16. The process according to claim 15 wherein the chosen and provided response in the form of universal resource locator is directed to an advertisement targeted to the particular client subscriber/user/viewer.

17. The process according to claim 15 wherein the chosen and provided response in the form of universal resource locator is directed to a coupon targeted to the particular client subscriber/user/viewer.

18. The process according to claim 15 wherein the choosing and providing is of a response in the form of a control signal and accompanying information to the client subscriber/user/viewer.

19. The process according to claim 18 wherein the chosen and provided response in the form of a control signal and accompanying information causes branching by the particular client subscriber/user/viewer.

20. The process according to claim 18 wherein the chosen and provided response in the form of a control signal and accompanying information causes a display by the particular client subscriber/user/viewer.

21. The process according to claim 14 further comprising:

running a contest of skill among the collective notices of all subscribers/users/viewers who do timely volitionally select a particular hyperlink;

wherein the choosing and providing is of a response in the form of a win/lose notification of the contest.

22. The process according to claim 14 further comprising:

running a lottery of chance among the collective notices of all subscribers/users/viewers who do timely volitionally select a particular hyperlink;

wherein the choosing and providing is of a response in the form of a win/lose notification of the lottery.

23. The process according to claim 14 wherein the choosing and providing is of a response in the form of a dunning notice targeted to the particular one subscriber/user/viewer who has not paid his or her bill from the network service provider.

24. The process according to claim 14 wherein the choosing and providing is of a response in the form of a pay-per-view video presentation.

25. The process according to claim 14 further comprising:
keeping track of the notice from the particular subscriber/user/viewer, and other notices from the same subscriber/user/viewer, as accumulated information revealing the preferences and the activities of the particular subscriber/user/viewer.

26. The process according to claim 25 further comprising:
providing hyperlinks in the first instance to the particular subscriber/user/viewer in consideration of previously accumulated information regarding the preferences and the activities of the particular subscriber/user/viewer.

27. In a digital communications network where hypervideo containing hyperlinks is communicated from a digital hypervideo server to a client subscriber/user/viewer, a method of resolving a exercise of a particular hyperlink by a particular client subscriber/user/viewer out of many such subscribers/users/viewers upon the network, the method comprising:
communicating the exercise of the particular hyperlink by the particular client subscriber/user/viewer over the network to a control server where is stored (i) all hyperlinks and (ii) information in respect of all subscribers/users/viewers;
providing across the digital communications network to the particular client subscriber/user/viewer a universal resource locator in accordance with (i) the exercised hyperlink, and (ii) the stored information;
using at the client subscriber/user/viewer the universal resource locator received across the digital communications network to access a network resource;
wherein the process is called "dynamic hyperlink resolution": because the universal resource locator provided each subscriber/user/viewer who has selected the same hyperlink is not the same, but is instead dependent upon the stored information.

28. The method according to claim 27 wherein the provided universal resource locator is to an advertisement in respect of the individual client subscriber/user/viewer exercising the hyperlink.

29. A computerized security process performed at a network service provider providing upon a communications network hypervideo to each of a multiplicity of subscribers/users/viewers upon the network, the process comprising:
receiving upon a digital communications network communicating hypervideo notice from a particular client subscriber/user/viewer out of many subscribers/users/viewers of hypervideo upon the network to the effect that the particular client subscriber/user/viewer has volitionally selected a hyperlink;
comparing (i) a unique identity of the particular subscriber/user/viewer to whom the hypervideo has been supplied with (ii) a pre-existing database of information regarding, inter alia, the preferences of each individual subscriber/user/viewer; and
choosing and providing a particular hyperlink to the particular subscriber/user/viewer in accordance with the information that was stored in the database regarding that particular subscriber/user/viewer;
wherein no subscriber/user/viewer will receive hyperlinks offensive to or inconsistent with pre-existing information regarding that subscriber/user/viewer, and, instead, each subscriber/user/viewer will receive only hyperlinks that are consonant with and in respect of the pre-existing information regarding that subscriber/user/viewer.

30. A computerized security process according to claim 29
wherein the comparing is to a pre-existing database of information regarding, inter alia, the status of accounts of each individual subscriber/user/viewer;
wherein hyperlinks to added cost services are omitted from hypervideo network communicated to subscribers/users/viewers whose accounts are in arrears.

31. A computerized security process according to claim 29
wherein the comparing is to a pre-existing database of information regarding, inter alia, the acceptability of information of certain types to each individual subscriber/user/viewer;
wherein hyperlinks to information of certain types are omitted from hypervideo network communicated to subscribers/users/viewers who do not find such types of information acceptable.

* * * * *